(12) United States Patent
Holfelder

(10) Patent No.: US 12,365,032 B2
(45) Date of Patent: Jul. 22, 2025

(54) METHOD AND DEVICE FOR GENERATING CONTROL DATA FOR AN ADDITIVE MANUFACTURING DEVICE

(71) Applicant: EOS GmbH Electro Optical Systems, Krailling (DE)

(72) Inventor: Peter Holfelder, Neufahrn bei Freising (DE)

(73) Assignee: EOS GmbH Electro Optical Systems, Krailling (DE)

(*) Notice: Subject to any disclaimer, the term of this patent is extended or adjusted under 35 U.S.C. 154(b) by 949 days.

(21) Appl. No.: 17/291,874

(22) PCT Filed: Nov. 5, 2019

(86) PCT No.: PCT/EP2019/080178
§ 371 (c)(1),
(2) Date: May 6, 2021

(87) PCT Pub. No.: WO2020/099172
PCT Pub. Date: May 22, 2020

(65) Prior Publication Data
US 2022/0008996 A1     Jan. 13, 2022

(30) Foreign Application Priority Data
Nov. 12, 2018   (DE) .................... 10 2018 128 265.6

(51) Int. Cl.
*B22F 10/85*     (2021.01)
*B22F 10/28*     (2021.01)
(Continued)

(52) U.S. Cl.
CPC .............. *B22F 10/85* (2021.01); *B22F 10/36* (2021.01); *B22F 12/41* (2021.01); *B33Y 10/00* (2014.12);
(Continued)

(58) Field of Classification Search
CPC .......... B22F 10/85; B22F 12/41; B22F 10/36; B22F 12/45; B22F 12/49; B22F 12/90;
(Continued)

(56) References Cited

U.S. PATENT DOCUMENTS 11,458,540 B2   10/2022  Domrose
2004/0191645 A1*  9/2004  Taniguchi ............ B23K 26/073
                                                              430/5
(Continued)

FOREIGN PATENT DOCUMENTS

CN       107530962       1/2018
DE       102015215645    2/2017
(Continued)

OTHER PUBLICATIONS

Tien TI. Roehling et al., "Modulating laser intensity profile ellipticity for microstructural control during metal additive manufacturing" in Acta Materialia, 128 (2017), pp. 197-206.
(Continued)

*Primary Examiner* — Elizabeth M Kerr
*Assistant Examiner* — Simpson A Chen
(74) *Attorney, Agent, or Firm* — Polsinelli PC

(57) ABSTRACT

Disclosed is a method and device for generating additive manufacturing control data. The control data are generated such that the energy beam has an intensity distribution, at the area of incidence on the build field, in a see tion plane running perpendicularly to the beam axis of the energy beam, which intensity distribution
  has at least one local minimum in a middle region along at least one secant of the intensity distribution in the section plane and
  has an intensity profile curve, running along the edge of the intensity distribution, which intensity profile curve has, at least at one point, a maximum value, and, at least
(Continued)

at one point in a region opposite the maximum value on the intensity profile curve, a minimum value.

21 Claims, 14 Drawing Sheets

(51) Int. Cl.
    *B22F 10/36* (2021.01)
    *B22F 10/366* (2021.01)
    *B22F 10/368* (2021.01)
    *B22F 12/41* (2021.01)
    *B22F 12/45* (2021.01)
    *B22F 12/46* (2021.01)
    *B22F 12/49* (2021.01)
    *B22F 12/90* (2021.01)
    *B33Y 10/00* (2015.01)
    *B33Y 50/02* (2015.01)

(52) U.S. Cl.
    CPC ............... *B33Y 50/02* (2014.12); *B22F 10/28* (2021.01); *B22F 10/366* (2021.01); *B22F 10/368* (2021.01); *B22F 12/45* (2021.01); *B22F 12/46* (2021.01); *B22F 12/49* (2021.01); *B22F 12/90* (2021.01)

(58) Field of Classification Search
    CPC ........ B22F 12/46; B22F 10/28; B22F 10/368; B22F 10/366; B23K 26/0626; B23K 26/073; B33Y 10/00; B33Y 50/02; G02B 27/0933; G02B 27/0927
    USPC ...................................................... 219/121.61
    See application file for complete search history.

(56) References Cited

U.S. PATENT DOCUMENTS

| | | | | |
|---|---|---|---|---|
| 2012/0266814 | A1* | 10/2012 | Clark | B23K 26/0732 118/620 |
| 2013/0105447 | A1 | 5/2013 | Haake | |
| 2017/0052381 | A1* | 2/2017 | Huang | B23K 26/073 |
| 2017/0151630 | A1 | 6/2017 | Huang et al. | |
| 2017/0239724 | A1* | 8/2017 | Diaz | B33Y 10/00 |
| 2017/0282244 | A1* | 10/2017 | Mizuno | B28B 17/0081 |
| 2018/0043432 | A1 | 2/2018 | Domrose | |
| 2018/0217410 | A1* | 8/2018 | Martinsen | G02B 27/0933 |
| 2018/0259732 | A1 | 9/2018 | Pontiller-Schymura | |
| 2020/0269500 | A1 | 8/2020 | Pieger et al. | |
| 2021/0129426 | A1* | 5/2021 | Thomson | B23K 26/08 |
| 2021/0387284 | A1* | 12/2021 | Holfelder | B23K 26/082 |

FOREIGN PATENT DOCUMENTS

| | | |
|---|---|---|
| DE | 102016121547 | 3/2018 |
| DE | 102017105057 | 9/2018 |
| DE | 102017219982 | 5/2019 |
| WO | 2016026706 | 2/2016 |

OTHER PUBLICATIONS

Gusarov Andrey V et al: "On productivity of laser additive manufacturing," Journal of Materials Processing Technology, Elsevier, NL, vol. 261, May 31, 2018, pp. 213-232, XP085417604, Issn: 0924-0136, DOI: 10.1016/J.JMATPROTEC.2018.05.033 abstract; figures 4,5, 10,19; table 4, p. 229-231.

Sundqvist j. et al: "Numerical optimization approaches of single-pulse conduction laser welding by beam shape tailoring," Optics and Lasers in Engineering, vol. 79, Dec. 16, 2015, pp. 48-54, XP029381344, ISSN: 0143-8166, DOI: 10.1016/J.OPTLASENG. 2015.12.001, p. 48-49, abstract; drawings 1-2, p. 53-54.

Govekar, E., Jeromen, A., Kuznetsov, A., Levy, G., Fujishima, M.: Study of an annular laser beam based axially-fed powder cladding process. In: CIRP Annals—Manufacturing technology 67, Jan. 5, 2018, pp. 241-244.

Chinese Office Action for Application No. 201980072628.3, dated Dec. 5, 2022, 10 pages.

* cited by examiner

METHOD AND DEVICE FOR GENERATING CONTROL DATA FOR AN ADDITIVE MANUFACTURING DEVICE

TECHNICAL FIELD OF THE INVENTION

The invention relates to a method and a control data generation device for generating control data for a device for the additive manufacture of a manufacturing product in a manufacturing process in which build-up material is built up and selectively solidified. Here, for the solidification process, the usually shapeless or flowable, generally powdery, build-up material is irradiated with at least one energy beam on a build field, and an area of incidence of the energy beam on the build field is moved in order to melt the build-up material, at least locally in the region of the area of incidence or in a target region in and around the area of incidence. Furthermore, the invention relates to a method and a control device for controlling a device for the additive manufacture of a manufacturing product using said control data, and to a device for the additive manufacture of manufacturing products.

BACKGROUND OF THE INVENTION

Methods for irradiating a material with an energy beam, for example a laser beam or the like, in particular for local melting of the material, are required in many processes. A typical example of this is welding with an energy beam, or rather laser welding. Another large area of application is in additive manufacturing. Additive manufacturing processes have become increasingly relevant in the production of prototypes and individual manufacturing products, and in the meantime also in series production. In general, "additive manufacturing processes" are understood to be those manufacturing processes in which a manufacturing product (hereinafter also referred to as a "component") is built up generally on the basis of digital 3D construction data by depositing material (the "build-up material"). The build-up is usually, but not necessarily, performed layer by layer. The term "3D printing" is often used as a synonym for additive manufacturing; the production of models, samples and prototypes by additive manufacturing processes is often referred to as "rapid prototyping"; and the production of tools as "rapid tooling". A key point in these processes is the selective solidification of a build-up material, and this solidification can be achieved in many manufacturing processes with the aid of irradiation with radiant energy, for example electromagnetic radiation, in particular light and/or heat radiation, but optionally also with particle radiation, such as electron radiation. Examples of methods that utilise irradiation are "selective laser sintering" or "selective laser melting". In this process, thin layers of a usually powdery build-up material are repeatedly applied one on top of the other, and in each layer the build-up material is selectively solidified by spatially delimited irradiation of the areas that, after manufacture, are to be part of the manufacturing product that is to be produced, in that the powder grains of the build-up material are partially or completely melted with the help of the energy locally introduced by the radiation at this location. After cooling, these powder grains are then bonded together in a solid.

The selective irradiation, in particular the movement of an area of incidence of an energy beam on the build field, is, preferably also within the scope of the present invention, usually carried out in accordance with a suitable irradiation strategy. In this regard, the movement may be a deflection of the previously generated energy beam or energy beam bundle as is provided with the usual "scanning", for example by galvanometer mirrors in the case of a laser beam, or by electromagnetic deflection in the case of an electron beam or ion beam. If necessary, a movement can also (at least partially) be effected by a movement of the beam delivery unit or irradiation device, in particular an energy beam source, itself, for example in the form of a movable diode bank, in particular a laser diode bank.

As a rule, larger two-dimensional regions, i.e. larger areas on the build field, are to be irradiated during a solidification process. Irrespective of how the energy beam is generated and how exactly the point of incidence on the build field is moved, it has proven advantageous to first virtually "divide" the regions to be irradiated according to a selected pattern, for example into virtual "stripes", a diamond pattern, a chequerboard pattern or the like. The individual areas of this pattern, for example the stripes or fields, are then usually run over with the energy beam in the form of a so-called "hatching" (also referred to generally and hereinafter as a "hatch"). In a striped pattern, for example, —viewed macroscopically—the build-up material is thus gradually solidified along parallel strips, and in detail—viewed microscopically—the area of incidence of the energy beam on the build field moves along hatching lines which are arranged closely next to one another and run transversely to the respective irradiation strips in the boundaries of the irradiation strip.

In practical applications or in the machines or devices known hitherto for additive manufacturing, energy beams are usually used, for example laser beams, which have substantially rotationally symmetrical (i.e. circularly symmetrical) intensity distributions. Such a rotationally symmetrical intensity distribution often corresponds to a Gaussian profile. In a Gaussian intensity distribution, the intensity is highest in the centre of the energy beam and weakens in all directions radially outwards transversely to the direction of propagation or the current beam path direction of the energy beam (hereinafter also referred to as "beam direction" or "beam axis" for short) according to a Gaussian function or Gaussian curve. This intensity distribution can be obtained without further measures from the energy beam sources used hitherto, for example a common laser.

However, the latest findings or research show that the exact shape of the intensity distribution of the energy beam, in particular the laser beam, can certainly have a not inconsiderable influence on the entire manufacturing process, in particular, for example, on the efficiency and thus also on the specific energy consumption and/or the quality of the manufacturing product, for example its microstructure. A comparison between a laser beam with a Gaussian intensity distribution and a non-rotationally symmetrical intensity distribution, namely an elliptical intensity distribution, is described, for example, in Tien T. Röhling et al., "Modulating laser intensity profile ellipticity for microstructural control during metal additive manufacturing" in Acta Materialia, 128 (2017), pp. 197-206. Here, it is also shown that not only the intensity distribution itself, but also its orientation in relation to the current direction of movement of the energy beam or its area of incidence on the build field (hereinafter also referred to as the "scanning direction" without limitation of generality) can have an impact on the manufacturing process.

For example, in practice, laser sintering or laser melting of metals is currently mostly carried out with a so-called "deep welding process" ("keyhole mode welding"). A welding process is defined as a deep welding process when a vapour capillary, also called a "keyhole", forms. The incident energy beam, especially a laser beam, in this case creates a weld pool of molten material or metal. If the weld pool surface of the material reaches its boiling temperature due to continued irradiation, the vapour bubble pushes the melt away laterally and downwards, thus creating the vapour capillary. The diameter of this keyhole is often smaller than that of the energy beam or laser beam. One advantage of this deep welding process is the high depth effect. This means that a deeper weld pool is formed in relation to the beam diameter than would be the case if such vaporisation did not take place. A welding process or melting process without vaporisation is referred to hereinafter as "heat conduction welding" (also "conduction mode welding" or "conduction laser welding").

However, such a deep welding process also has a number of disadvantages:

On the one hand, a relatively high energy has to be provided by the energy beam in order to vaporise the material. The enthalpy of vaporisation of the material is usually about two to five times higher than the enthalpy of fusion and is removed from the productive part of the process. Although the enthalpy of vaporisation is released again during the condensation of the metal vapour, it can no longer be used productively for the process. This energy consumption increases the costs of the process.

Secondly, in order to maintain process stability, the vaporised material is usually largely removed from the process zone and in some cases even filtered out of the process atmosphere and disposed of. Given the high cost of metal powder, this can make component prices noticeably more expensive.

Thirdly, during vaporisation, the volume of the material (under normal conditions) increases by a factor of about 1000. This leads to high pressures in the metal vapour within the vapour capillary, or keyhole, which in turn can result in very high outflow speeds (of the order of Mach 0.3) of the metal vapour from the keyhole. This gas jet entrains neighbouring solid particles and/or droplets leaving the weld pool, causing further material losses. These particles and/or droplets are usually referred to as "spatter".

Fourthly, the metal gas usually flows exactly against the direction of incidence of the energy beam and condenses in the process. The incident energy beam can interact uncontrollably with this outflowing and condensing metal gas by absorption and scattering. To largely avoid this process-relevant disturbance, the flow direction of the metal gas can be diverted as quickly and efficiently as possible. This can be done, for example, with a flow curtain of shielding gas oriented tangentially to the powder bed, the speed of which gas curtain must, however, be high enough to sufficiently reduce the undesirable effects. However, the flow speed is then generally so high that relevant quantities of powdery material can also be entrained from the powder bed, just as strong wind entrains dust from the ground (wind erosion). By means of a process gas recirculation system, process by-products or impurities, such as metal condensate or raw powder, are generally removed from the process chamber and can be collected downstream of the process chamber in filters and, optionally, separators of the exhaust air system. This material is often lost and must also be disposed of in a time-consuming and cost-intensive manner.

The material losses from the various loss sources explained above can amount to a not inconsiderable proportion of the weight of the assembled components. Therefore, their avoidance or significant reduction would have a noticeable cost-reducing effect.

Which welding process is more suitable in a specific case can depend on various constraints and can also change during the manufacturing process, for example depending on the location within the component to be manufactured. Whether the welding process is carried out as a heat conduction welding process or as a deep welding process again depends on various parameters. An essential parameter can also be the shape of the intensity distribution.

SUMMARY OF THE INVENTION

It is an object of the present invention to disclose a suitable method and a corresponding control data generation device for generating control data, as well as a method for controlling a device for the additive manufacture of a manufacturing product and a control device suitable herefor, as well as a device for additive manufacturing, in which an energy beam is used which is particularly well suited for a heat conduction welding process.

This is solved, on the one hand, by a method for generating control data (hereinafter also referred to as a "control data generation method") according to claim 1 and by a control data generation device according to claim 12 and, on the other hand, by a method for controlling a device for the additive manufacture of manufacturing products (hereinafter also referred to as the "control method") according to claim 11, a control device for an additive manufacturing device according to claim 13, and an additive manufacturing device according to claim 14.

In a method according to the invention, the control data for a device for the additive manufacture of a manufacturing product in a manufacturing process explained above are generated such that the energy beam has an intensity distribution, at the area of incidence on the build field, in a section plane running perpendicularly to the beam axis (i.e. perpendicularly to the beam direction or direction of incidence) of the energy beam, which intensity distribution has the features defined below.

In this regard, it should first be noted that, in general, an "intensity distribution" of an energy beam within the meaning of the present application comprises the spatial shape or extent of the energy beam in a section plane (cross-sectional area) perpendicularly to the beam direction or beam axis and also the spatial distribution of the intensity over the cross-sectional area, i.e. in particular the positions of maxima and minima, etc. The wording "at the area of incidence on the build field" is to be understood as referring to the intensity distribution in the section plane perpendicularly to the direction of incidence shortly before the area of incidence, which in most situations does not correspond to the intensity distribution directly on the surface of the build field or in the working plane, since the energy beam usually strikes the build field at an angle. However, this does not exclude the possibility that, during the course of the process, said section plane will always coincide with the area of incidence, since the energy beam is at that moment perpendicular to the area of incidence.

According to the invention, this intensity distribution of the energy beam generated on the basis of the control data is parameterised as follows:

On the one hand, the intensity distribution according to the invention has, in a middle region, at least one local minimum along at least one secant (an edge curve) of the intensity distribution in the section plane extending perpendicularly to the beam axis of the energy beam. A "secant" in the sense of the present invention runs from one side to the other side through an area of the intensity distribution, i.e. it intersects the edge of the intensity distribution at exactly two points spaced apart from each other, irrespective of the exact shape or course of the edge curve or edge, and may, but need not, run through the beam axis or the centre of the intensity distribution (in this case the secant would correspond to a diameter). In particular, the secant does not lie exclusively on the edge curve. Preferably, the secant runs transversely, preferably substantially perpendicularly, to the scanning direction of the energy beam on the build field. Also preferably, the secant runs through a geometric centre of gravity of the shape or form of the intensity distribution in the section plane.

The "middle region" is understood here to be a central region of the intensity distribution, i.e. the local minimum is located in the region of the secant that runs through this middle region. It is distinguished from an edge region of the intensity distribution, which runs along an edge of the intensity distribution and extends from the edge into the intensity distribution, more specifically preferably to such an extent that an area share of the edge region in the total area content of the intensity distribution comprises at least 10%, preferably at least 20% and/or at most 50%, preferably at most 40%. With reference to the case of a circular intensity distribution, the edge region accordingly extends, for example, by 10% or by 20% of the radius of the intensity distribution from the edge into the intensity distribution. Here, the "edge" of the intensity distribution is arbitrarily defined such that 99% of the radiant power of the energy beam is located within the edge (i.e. in the area enclosed by the edge).

On the other hand, the intensity distribution according to the invention preferably has a (completely) circumferential intensity profile curve which is shifted inwards along the edge of the intensity distribution, substantially parallel to the edge, and which has a maximum value at least at one point and a local minimum value in a region opposite the maximum value on this intensity profile curve. An "intensity profile curve" is understood here to be an intensity profile of the intensity distribution as a function of location along a defined, appropriately selected curve. The term "local minimum value" is to be understood here in such a way that it is a minimum value with regard to the course of the intensity values on this intensity profile curve, i.e. if the intensity is measured along this intensity profile curve and plotted in a diagram, a local minimum value is shown here.

A "region opposite" the maximum value on the intensity profile curve means a region which in both directions along the intensity profile curve encloses at most an angle of 60°, preferably at most 50°, further preferably at most 40°, further preferably at most 30°, particularly preferably at most 10° starting from the position (diametrically) opposite the maximum value on the intensity profile curve. Very particularly preferably, the local minimum value is substantially (i.e. within the usual tolerances) diametrically opposite the maximum value on the intensity profile curve. In a narrower sense, the term "diametrically" refers in particular to circular intensity profile curves. More generally, however, i.e. also in the case of an irregular shape of the intensity profile curve, a corresponding opposite point can, for example, be constructed in such a way that, starting from the maximum value, a secant is laid through the centre of gravity of the area enclosed by the edge of the intensity distribution; where the secant intersects the intensity profile curve again is then the "diametrically" opposite point within the meaning of this application.

With this preferred intensity distribution, it is thus ensured that a higher intensity is deliberately achieved in a peripheral region along the edge, at least in some sections, preferably all around, than in a central region. A local minimum is located in the centre, i.e. at the beam axis and/or at a short distance from it, for example within half a distance from the centre to the edge.

The second parameterisation of the intensity distribution with a maximum value and an opposite minimum value on an intensity profile curve running along the edge also ensures that the intensity distribution is deliberately not rotationally symmetrical with respect to a rotation axis running coaxially to the direction of incidence of the combination energy beam on the material or build field.

The term "rotationally symmetrical" here refers to a rotation axis that is coaxial to a beam direction of the energy beam. Until now, as also mentioned above, the energy beams are usually generated in such a way that they are rotationally symmetrical, namely, for example, have the aforementioned Gaussian intensity distribution. In contrast, in the following, the term "non-rotationally symmetrical" or "substantially non-rotationally symmetrical" is to be understood as those energy beams whose intensity distribution has been deliberately generated non-rotationally symmetrically to a significant degree and/or has been influenced accordingly by the targeted modification of a beam and/or by the superimposition of energy beams to obtain a combination energy beam with a non-rotationally symmetrical overall intensity distribution. This does not include energy beams that should, per se, have a usual rotationally symmetrical, for example Gaussian, intensity distribution and merely exhibit undesirable deviations from rotational symmetry, for example due to unintentional distortions or other imperfections of the system for generating and/or moving the energy beam. For example, if the intensity distribution of the output energy beam generated in the desired manner were to be mathematically defined as a function $I(r, \phi)$ of the location in polar coordinates $r$ and $\phi$ (in a plane perpendicular to the beam direction), then the intensity distribution could preferably be described or defined as "non-rotationally symmetrical" if no point of origin can be found within the intensity distribution which, for any m, under the condition $m \geq 2$ and any r, satisfies the following property:

$$\left| 1 - \left( \frac{I(r, \phi_0)}{I(r, \phi_0 + 360°/m)} \right) \right| < \varepsilon$$

wherein $\varepsilon \leq 0.01$, preferably $\varepsilon \leq 0.05$, further preferably $\varepsilon \leq 0.1$ even further preferably $\varepsilon \leq 0.2$. More precisely, an intensity distribution defined in this way is not rotationally symmetrical in any dimension.

An intensity distribution parameterised in the manner according to the invention allows a simpler setting of a target temperature on the build field in the region of the area of incidence in order to keep the melting process within the process window of heat conduction welding. As will be explained in more detail later on the basis of a specific embodiment example using virtual functional regions, a relatively fast heating of the material can be achieved with the region around the maximum value. The higher intensity present in a peripheral region along the edge, at least in some sections, than in a central region serves to compensate for the heat losses from the active process zone, i.e. from the area of incidence, into the surrounding build-up material. The middle region of the intensity distribution surrounded by these regions serves to adjust and control the temperature profile in the melt so that the desired process range of heat conduction welding can be maintained.

In a method according to the invention for controlling a device for the additive manufacture of a manufacturing product, control data are first generated in the manner according to the invention and are then used to control the device with the control data. In this case, the control data can be generated in advance and transmitted as a complete data package or as a type of "control protocol" to the device, which then carries out the production process. In principle, however, it would also be possible to determine control data during the already running process for subsequent process steps, for example while a layer is being solidified, to determine the control data for the next layer and to use it during the solidification of the further layer. This means that the control data can also be modified dynamically during the process, for example also on the basis of process monitoring data or quality data based on this.

The starting point for the control data is, among other things, data that indicate at which points within the process area or the construction area material is to be solidified, i.e. which parts are later to belong to the component or to any support structures or the like and which regions are not. This data can be taken, for example, from a digital 3D model of the object to be manufactured and/or the support structures. If these data and further required information are available, such as which material is used, which solidification device, in particular which type of energy beam, is available or within the framework of which parameters this is adjustable, etc., an intensity distribution that is optimised or optimal for the case in question and that fulfils the above-mentioned features according to the invention can then be determined, and the control data can be generated accordingly.

The control data according to the invention can basically be exposure control data or scan data. Among other things, these can also define or prescribe the movement of the energy beam over the surface, as well as the level of the energy or laser intensity and/or an extent of the beam perpendicularly to the beam direction. In particular, however, the control data comprise data or information for an irradiation device of the additive manufacturing device regarding the above-defined desired intensity distribution or the intensity distribution to be set or "shape" of the beam perpendicularly to the beam direction at the area of incidence. In addition, the control data as a whole can also include other data required for other components of the additive manufacturing device of a manufacturing product, such as information about the layer thickness, etc.

A control data generation device according to the invention for generating control data for a device for the additive manufacture of a manufacturing product is correspondingly designed in such a way that the control data are generated in such a way that the energy beam has an intensity distribution, at the area of incidence on the build field, in a section plane running perpendicularly to the beam axis of the energy beam, which intensity distribution has at least one local minimum in a middle region along at least one secant of the intensity distribution in the section plane and has an intensity profile curve, running along the edge of the intensity distribution, which has, at least at one point, a maximum value, and, at least at one point in a region opposite the maximum value on the intensity profile curve, a minimum value.

The control data generation device can, for example, be part of a control device of such a manufacturing device for the additive manufacture of a manufacturing product. However, it can also be implemented independently on another computer in order to then transfer the data to the control device.

Accordingly, a control device according to the invention for such a device for the additive manufacture of a manufacturing process has a control data generation device according to the invention or an interface to such a control data generation device for providing the relevant control data or for transferring the control data from the control data generation device, and this control device is designed to control the additive manufacturing device for irradiating the build-up material with the energy beam using this control data. The control device preferably ensures coordinated control of all components of the additive manufacturing device. In particular, the control device can also comprise a plurality of sub-control devices which are assigned, for example, to the irradiation device, in particular to the first and/or second energy beam movement unit mentioned later, and/or to other components and which cooperate in a suitable manner. The control device or the sub-control devices can—as explained later—also be implemented completely or partially in the form of software.

A device according to the invention (hereinafter also referred to as a "manufacturing device") for the additive manufacture of manufacturing products in an additive manufacturing process has, in addition to the usual components, such as a feed device (often also referred to as a "coater") for introducing build-up material—for example in the form of a layer of build-up material, which in particular, as mentioned, is shapeless or flowable—into a process area, and an irradiation device for selectively solidifying the build-up material by irradiation of at least one such control device by means of an energy beam.

It should be noted at this juncture that the device according to the invention can also have a plurality of irradiation devices, which are then controlled in a correspondingly coordinated manner with the control data. It should also already be mentioned that, in this respect, the energy beam, the intensity distribution of which is to have the features according to the invention, can also consist of a plurality of superimposed energy beams, as will be explained later. Accordingly, the control signals for the individual components for generating the energy beams would then have to be generated so that the desired result with regard to the intensity distribution is achieved overall. Similarly, the irradiation devices can be used to generate a plurality of separate energy beams with the features according to the invention in order to consolidate material in parallel at a number of positions on the build field. A combination of these variants is also possible.

The control data generation device according to the invention can—just like other parts of the control device or the control device as a whole—be realised in the form of a computer unit with suitable software. The computer unit may, for example, have one or more cooperating microprocessors or the like for this purpose. In particular, the control data generation device may be implemented in the form of suitable software program parts in the computer unit of a control device of a manufacturing device according to the invention. A largely software-based realisation has the advantage that computer units already in use, in particular control devices of manufacturing devices for additive manufacturing, can be retrofitted in a simple manner by means of a software or firmware update in order to operate in the manner according to the invention.

In this respect, the object is also achieved by a corresponding computer program product with a computer program which can be loaded directly into a memory device of a computer unit, in particular a control device, with program sections to execute all steps of the method according to the invention when the program is executed in the computer unit or control device. In addition to the computer program, such a computer program product may optionally comprise additional parts, such as documentation and/or additional components, including hardware components, such as hardware keys (dongles, etc.) for using the software. A computer-readable medium, for example a memory stick, a hard disk or another transportable or permanently installed data carrier, on which the program sections of the computer program that can be read and executed by a computer unit, in particular the control device, are stored, can be used for transport to the computer unit or control device and/or for storage on or in the computer unit or control device.

Further, particularly advantageous embodiments and further developments of the invention will become clear from the dependent claims as well as the following description, wherein the independent claims of one claim category can also be further developed analogously to the dependent claims and embodiment examples of another claim category and, in particular, individual features of different embodiment examples or variants can also be combined to form new embodiment examples or variants.

As will be explained later with reference to embodiment examples, it may be particularly preferred to ensure that the intensity distribution has a local intensity increase extending in an at least partially annular circumferential edge region (or in a segment of the annular edge region) of the intensity distribution. In other words, in at least one region along its contour at a short distance from the edge, the intensity distribution has an increased intensity in relation to a middle region (i.e. a local maximum region in relation to a surrounding environment). Here, the edge region is again to be understood as the region between the central region defined above and the edge. The circumferential intensity profile curve preferably runs along the partially ring-shaped circumferential edge area, at least in some sections.

The local increase in intensity at one point on the intensity profile curve and the local minimum in the region on the opposite side of the intensity profile curve can, in particular, produce an intensity distribution with a kind of crescent-shaped increase in intensity.

Preferably, it is ensured that the maximum value on the circumferential intensity profile curve lies in an edge region of the intensity distribution lying at the front in a scanning direction. Correspondingly, the local minimum on the intensity profile curve would lie in an edge region lying at the rear in the scanning direction. This does not exclude the existence of further local maxima and local minima on the intensity profile curve.

The "forward edge region" in the scanning direction may preferably be a distance over a radian measure of at most approximately $\frac{2}{3}\pi \cdot r$ (r is here the radius of orbit, which, depending on the beam shape, may be equivalent to the radius of curvature. It can be defined here for any beam shape or shape of the intensity distribution that the circumference of the profile of the beam shape is defined as $2 \cdot \pi \cdot r$), further preferably of at most approximately $\frac{1}{2}\pi \cdot r$, even further preferably of at most approximately $\frac{1}{3}\pi \cdot r$, particularly preferably of at most approximately $\frac{1}{6}\pi \cdot r$, wherein the area covered by the resulting angular range includes the point of the intensity distribution located at the front in the scanning direction.

In particular, a circular intensity distribution can thus be an angular range (in the case of a circular intensity distribution around a ring segment) of at most approximately 120°, further preferably of at most approximately 90°, even further preferably of at most approximately 60°, particularly preferably of at most approximately 30°, wherein the area covered by the angular range includes the point of the intensity distribution located at the front in the scanning direction.

Preferably, the minimum value on the intensity profile curve is higher than the local minimum in the middle region, i.e. in the centre or near the centre of the intensity distribution.

In the region of the minimum in the middle region, the intensity is preferably a maximum of 1.5 MW/cm$^2$. Preferably, the intensity here is at least 0.05 MW/cm$^2$.

Preferably, the intensity on the intensity profile curve running along the edge is, at any point, higher than the local minimum in the middle region of the intensity distribution. In other words, the intensity distribution has a complete annular intensity increase in the edge region, but the magnitude of the intensity increase varies depending on the location over the circumference.

The ratio of the intensity of the maximum value on the circumferential intensity profile curve, for example in a point of the local intensity increase running along the edge, to the intensity in a local minimum, in particular in the middle region of the intensity distribution, is preferably a maximum of 10:1, preferably a maximum of 9:1, further preferably a maximum of 8:1, particularly preferably 7:1.

Preferably, the ratio of the intensity of the minimum value on the circumferential intensity profile curve to the intensity in a local minimum is at least 1.5:1, preferably at least 2:1, further preferably at least 3:1, particularly preferably at least 4:1.

Preferably, the maximum value on the intensity profile curve running along the edge is at least one and a half times, further preferably at least twice, even more preferably at least three times, particularly preferably at least four times higher than the local minimum value in the region opposite on the intensity profile curve. The maximum value on the intensity profile curve running along the edge is also preferably at most eight times, further preferably at most seven times, even further preferably at most six times, particularly preferably at most five times higher than the local minimum value in the region opposite on the intensity profile curve.

Between the maximum value and the minimum value in the region opposite on the intensity profile curve, the (location-dependent) function of the intensity values along the intensity profile curve can in principle run as desired. It is particularly preferably curved. It is preferably a "smooth" function without jumps. Preferably, this function is differentiable at least once at each point, preferably is differentiable at least twice, particularly preferably is differentiable any number of times.

However, this does not exclude that the intensity distribution can in principle also be defined by a step function or a number of superimposed step functions.

Preferably, the intensity distribution of the energy beam can be set to be substantially axially symmetrical or substantially non-axially symmetrical, depending on an area of incidence environment parameter, with respect to an axis of symmetry lying in the scanning direction.

An "axially symmetrical" setting means that an axial symmetry exists within the usual tolerances. A "substantially non-axially symmetrical" setting means that this axis symmetry is deliberately not observed, i.e. there is a deviation from the axis symmetry beyond the usual tolerances.

The area of incidence environment parameter can in particular be understood as a parameter indicating whether the current track (for example a hatch) runs next to already solidified material, i.e. whether for example a first track is drawn that is not laterally adjacent to a previous track, or whether it is a further track.

Since solidified material has different thermophysical properties than unsolidified material, compensation can be achieved by deliberately deviating from the axis symmetry. For this purpose, it can be ensured, for example, that the maximum value on the intensity profile curve running along the edge is not exactly at the front in the scanning direction, but a little further away from or closer to the already solidified track (for example the already processed neighbouring hatch). In other words, the entire intensity profile curve is rotated away from or towards the already solidified track with respect to the maximum about the rotation axis of the intensity profile curve. At the same time, it is ensured that the minimum value on the intensity profile curve of the intensity distribution is rotated towards or away from the already solidified track. The direction in which the rotation takes place can depend, for example, on whether the immediately adjacent, already solidified track is still hot or has already cooled down. A cooled, hardened track has more mass and absorbs energy more poorly because a "smooth" surface reflects more radiation. When a track is cooled down, the maximum of the neighbouring track to be subsequently solidified will therefore preferably be closer to this previously solidified track than when it is still hot and already contains more energy, so that less new energy has to be introduced.

There are various ways to generate an energy beam with the desired intensity distribution.

For example, the desired beam shaping could take place already when the energy beam is generated. For example, a laser could be constructed with many laser channels that can be coherently combined to act and function together as a single coherent laser source. This could inherently offer the possibility to additionally modulate each individual laser channel highly dynamically in phase and amplitude to achieve the desired variable beam shaping, in particular the desired intensity profile.

Furthermore, an energy beam generated by an energy beam source, i.e. also initially rotationally symmetrical, can only be "shaped" or modified afterwards within a beam shaping device in order to obtain the desired intensity distribution. Such a beam shaping device can also be realised in various ways.

Preferably, the beam shaping device can have at least one micro-optical element that can be controlled by a control device. A so-called diffractive optical element (DOE) is particularly preferred. DOEs can work reflectively or transmissively, for example, and change the wavefront of an incident beam by locally modulating the phase and/or amplitude of the reflected or transmitted partial beams.

Since—sometimes very fast—changes of direction can also occur during irradiation and, as a rule, a certain intensity distribution is always defined in relation to the current direction of movement, i.e. scanning direction, the direction of the ideal intensity distribution on the build field or material must change frequently (for example, in order to align the maximum value with the current hatch direction, as mentioned above). This requires a fast response of the irradiation device with respect to changes in the intensity distribution. Another point is that, depending on the exact manufacturing parameters, relatively high spatial intensity differences within the intensity distribution are desirable, as have already been partly defined above.

In order to provide an energy beam of which the intensity distribution can have high spatial intensity differences and which can nevertheless be changed quickly, a method can be used, for example, in which control data are generated for the generation of at least two energy beams—and accordingly also two energy beams—so that the intensity distribution is generated by a superimposition of the energy beams.

In other words, at least a first energy beam and a second energy beam are generated. This can be done, for example, by an energy beam source system with at least two separate energy beam sources, for example two lasers. In principle, however, it would also be possible for the energy beams to be generated first by one energy beam source and then to be split, for example in a beam splitter or the like.

Preferably, the control data are generated in such a way that a first energy beam together with a second energy beam at least partially superimposed as a "combination energy beam" is moved over the material or build field in a coordinated manner at a predetermined scanning speed, which can also be changed dynamically.

Particularly preferably, a, preferably cyclic and/or preferably continuous, relative movement of the second energy beam with respect to the first energy beam takes place simultaneously with a predetermined relative speed (which can also be dynamically controlled), the magnitude of which is much greater than the magnitude of the scanning speed.

This combination energy beam can then, as will be explained in more detail, have a (time-integrated) "overall intensity distribution" which has the features of the invention as defined above.

Preferably, the magnitude of the relative speed between the first energy beam and the second energy beam or of the first energy beam within the combination energy beam is at least twice as great as the magnitude of the scanning speed, further preferably at least five times greater, even further preferably at least ten times greater, particularly preferably fifty times greater and very particularly preferably even one hundred times greater.

Therefore, the amount of the relative speed can preferably be at least 5 m/s. It is particularly preferably at least 10 m/s, further preferably at least 20 m/s and very particularly preferably at least 50 m/s.

The magnitude of the scanning speed, on the other hand, is usually in a range of 0.01 m/s to 5 m/s, for example in the case of selective laser melting or selective laser sintering. In the case of electron beam melting, on the other hand, significantly higher speeds can also be achieved, for example 20 m/s or more. This means that the scanning movement is generally considerably slower than the relative movement of the second energy beam with respect to the first energy beam.

By moving the second energy beam relative to the first energy beam, in each case time-integrated "overall intensity distributions" of the combination energy beam can advantageously be generated over a certain period of time with almost any design. This integration time period should preferably be sufficiently long to allow the second energy beam to substantially traverse its path relative to the first energy beam. Therefore, in the case of a cyclic movement—already mentioned above and explained in more detail later—the integration time period could comprise at least one cycle of movement of the second energy beam relative to the first energy beam. Preferably, the integration time period is a longer period of time, for example an integer multiple of one movement cycle.

Since the area of incidence of the "combination energy beam" on the material moves, a relatively fast relative movement of the second energy beam with respect to the first energy beam can ensure that, during a scanning of the build field with the combination energy beam, a sufficient "residence time" (or "irradiation time period") is present at each location so that at least approximately the previously mentioned integration time period is achieved. In other words, the relative speed should preferably be high enough that the superimposed intensity distributions of the first and second energy beams act on the build-up material as a "quasi-stationary" overall intensity distribution in the time period of the physical process of heat conduction due to the inertia of the thermal diffusion (dissipation of heat). Considered visually, the material is thus basically supplied with a radiant energy corresponding to the overall intensity distribution over the integration time period, since, due to the lower scanning speed during the residence time (which is long in relation to the relative movement) of the combination energy beam at a location, the second energy beam with its intensity distribution within the overall intensity distribution of the combination energy beam scans all relative positions, preferably even scans several times, if the scanning movement (for this image) were to be considered non-existent. In a continuous scanning motion, there is of course always a small local offset with each revolution, but this does not significantly affect the heat distribution in the vicinity of the actual area of incidence due to the typically high scanning speeds and relatively slow thermal diffusion, and therefore the image referenced above approximately reflects the conditions well. In other words, it is ensured that the material to be melted or the material region "sees" an approximately "stationary" overall intensity distribution of the combination energy beam at a certain point in time when the combination energy beam hits the region in question. The minimum relative velocity required for this can therefore also depend significantly on the material parameters of the build-up material used, in particular the specific heat capacity. For example, it can be ensured that the Fourier number $Fo=(a-\Delta t)/d^2$ is as small as possible in order to achieve the "quasi-stationary" overall intensity distribution as well as possible, where a is the thermal diffusivity (material constant), $\Delta t$ is a characteristic time period (for example the period duration) and d is a characteristic length (for example an extent, such as the radius, of the overall intensity distribution). The smaller the Fourier number, the less heat is "transported away" in the time period under consideration, i.e. the period of one revolution of the second energy beam.

The "relative movement" of the second energy beam with respect to the first energy beam or the position of the beam axis of the second energy beam within the overall intensity distribution of the combination energy beam can comprise a very wide range of geometric paths or path curves (courses of a scanning path), i.e. translatory or rotatory movements or movement patterns. Particularly preferably, as mentioned, the relative movement of the second energy beam with respect to the first energy beam and/or the position of the second intensity distribution of the second energy beam within the overall intensity distribution runs on a closed curve, i.e. can be described as "periodically stationary". For example, the second energy beam can perform a circular or elliptical movement within the combination energy beam, or relative to the first energy beam, or move along a closed polygonal path. Likewise—depending on the specific requirement—as mentioned, other arbitrary curves are also possible, such as any other polygonal shape, a zig-zag line, a sinusoidal sweep (also known as oscillatory welding), etc., as long as the time-integrated "overall intensity distribution" of the combination energy beam generated by the superimposed energy beams (considered quasi-stationary) fulfils the features of the invention as defined above, i.e. the "overall intensity distribution" of the combination energy beam can have any shape or form within these limits.

Such a method for irradiating a material, in which a first energy beam and a second energy beam are generated and at least partially superimposed in the manner described and moved over the material at a predetermined speed, the second energy beam being moved relative to the first energy beam at a predetermined relative speed, the magnitude of which is much greater than the magnitude of the scanning speed, could in principle be achieved by a simple coordinated or synchronised control of two separate energy beam movement units or scanners over the build field.

In this case, the irradiation device according to the invention requires an energy beam source system for generating at least a first energy beam and a second energy beam, as well as a first energy beam movement unit and a second energy beam movement unit, and a control device which controls the irradiation device in such a way that the first energy beam and the second energy beam are at least partially superimposed as a combination energy beam and moved in a coordinated manner over the material or build field at a predetermined scanning speed, the second energy beam being moved relative to the first energy beam.

However, the following procedure can be used particularly preferably:

The second energy beam is moved relative to the first energy beam, and the first energy beam and the second energy beam moving relative thereto are then already coupled into an energy beam movement unit in a common beam path in such a way that they are moved together as a combination energy beam, for example over the build field with the build-up material in an additive manufacturing process. In this case, it is thus ensured that the energy beams run, for example, parallel or coaxially along the same beam path, and the current relative position of the intensity distributions of the first energy beam and the second energy beam in a section plane running perpendicularly to the beam axis of the combination energy beam (i.e. the virtual beam axes—defined later—or a corresponding beam path) does not change significantly on the path through the relevant energy beam movement unit from the coupling point into the energy beam movement unit, for example when using a scanner on the first scanner mirror, to the area of incidence. For example, if the intensity distribution of the first energy beam or the first energy beam itself is mirrored or rotated, the intensity distribution of the second energy beam or the second energy beam itself is simultaneously mirrored or rotated, etc.

The relative position between the first energy beam and the second energy beam is thus determined substantially only by the movement of the second energy beam relative to the first energy beam before the coupling into the energy beam movement unit for the combination energy beam. Here, the movement of the second energy beam "relative to the first energy beam" is the movement of the second energy beam that an observer moving with the first energy beam would "see". This relative movement of the second energy beam with respect to the first energy beam can be implemented by a separate, for example first energy beam movement unit, examples of which will be given later.

The combination energy beam is then moved across the build field by a second energy beam movement unit, for example a conventional scanner mirror when using laser beams. In other words, the relative positioning (of the intensity distribution) of the second energy beam in the combination energy beam (or within its intensity distribution) is achieved only by this first energy beam movement unit. The second energy beam movement unit moves the common area of incidence of the energy beams, i.e. the area of incidence of the combination energy beam (which in this respect could also be called a "unit beam"), and the combination energy beam changes its overall intensity distribution accordingly due to the movement of the second energy beam relative to the first energy beam.

In a preferred variant in this regard, it is simply ensured that the beam path of the first energy beam and a "virtual beam path" of the second energy beam run coaxially in order to be moved over the material in a coordinated manner as a superimposed combination energy beam. This "virtual beam path" (or "virtual beam axis") of the second energy beam moved relative to the first energy beam is defined as running through the geometric centre of gravity of a "virtual section plane area of incidence" lying in a section plane (as defined above) perpendicular to the (virtual) beam axis, with the "virtual section plane area of incidence" being defined by the area in the section plane which the second energy beam sweeps over with its spatial extent determined by its particular intensity distribution during a defined period of time. The defined time period is preferably at least long enough for the second energy beam to have passed through a movement cycle, particularly preferably a number of movement cycles, in a (preferred) repeating movement pattern. In this case, the time period is particularly preferably exactly one period (duration of a movement cycle) or an integer multiple of a period. In the case of a second energy beam circulating in a circular manner relative to the first energy beam, for example, the "virtual beam path" of the second energy beam could thus also be regarded as an "averaged beam path" or "averaged beam axis", which results when the position of the actual beam axis of the second energy beam, which moves relative to the beam axis of the first energy beam, is integrated over a certain integration time period as mentioned.

On the path of the common beam path, i.e. after the combination of the first energy beam and the second energy beam moving relative thereto according to the invention, the two energy beams pass through the same beam-deflecting or beam-modifying optical components as a combination energy beam on their respective paths.

An irradiation device usable for this purpose for irradiating a material accordingly has an energy beam source system, for example preferably a laser system, for generating at least the first energy beam and the second energy beam, wherein this energy beam source system can again have different energy beam sources for the different energy beams, or also beam splitters etc. Further, the irradiation device has a first energy beam movement unit for moving the second energy beam relative to the first energy beam, an energy beam combination device, and a second energy beam movement unit, which are formed and arranged relative to each other such that the first energy beam and the second energy beam moving relative thereto are coupled in a common beam path into the second energy beam movement unit in such a way that they are moved together as a combination energy beam by the second energy beam movement unit over the material or build field.

The energy beam combination device for coupling the first energy beam and the second energy beam moving relative thereto into the common beam path can comprise a beam combiner which is arranged downstream of the first energy beam movement device (i.e. downstream in the beam direction) and upstream of the second energy beam movement unit (i.e. upstream in the beam direction) in order to couple the first energy beam and the second energy beam, for example parallel to each other, for example with beam paths with a small spacing in relation to the beam extent or diameter of one of the beams, as will be explained below with reference to examples, into the second energy beam movement unit, for example onto the first scanner mirror of a conventional scanner system.

The beam combiner preferably has or can be formed by a polariser, particularly preferably a thin-film polariser.

When the energy beams or intensity distributions moved relative to each other are coupled into the common beam path by the second energy beam movement unit, it can be ensured that the optical components of the second energy beam movement unit, i.e. for example the scanner, as well as any subsequent components that may influence the direction of the energy beams, such as a coupling window in a construction space (process chamber) of a manufacturing device, have only negligible influence on the overall intensity distribution of the combination energy beam.

In particular, it would therefore also be possible to retrofit existing manufacturing devices with an irradiation device according to the invention, so the existing energy beam movement units, i.e. scanners for example, could continue to be used as second energy beam movement units within the scope of the invention without any modifications.

A manufacturing device can then correspondingly have at least one such irradiation device which is constructed in accordance with the invention or has been modified in accordance with the invention by retrofitting. It is also possible to retrofit existing manufacturing devices with an irradiation device according to the invention as a complete module or to replace the existing irradiation devices accordingly. This is also possible for manufacturing devices that work with a plurality of separate energy beams in order to solidify material in parallel at a number of positions on the build field. In this case, only individual, but also several—for example all—energy beams can be generated by corresponding irradiation devices.

Preferably, within the irradiation method, the second energy beam is intensity modulated (i.e. an intensity of the second energy beam is modulated) in dependence of its relative position to the first energy beam or in dependence of the current position in the combination energy beam, i.e. during the relative movement. Alternatively or additionally, the second energy beam can also be intensity modulated as a function of a current direction of movement of the combination energy beam on the material or build field, i.e. the current scanning direction, i.e. as a function of a direction of movement of a corresponding element of the energy beam movement unit(s), for example a scanner mirror. This is independent of where the two energy beams are combined or superimposed on each other, for example already before coupling into a common energy beam movement unit or only on or before impingement on the build field.

In principle, however, an intensity of the first energy beam could also be modulated.

In intensity modulation it is preferred that the minimum intensity is at least always greater than 0, i.e. that the second energy beam within the combination energy beam always contributes to an increase in the overall intensity at the particular location in the overall intensity distribution of the combination energy beam.

An intensity modulation makes it possible to generate combination energy beams whose (time-integrated) overall intensity distribution has, for example, an absolute maximum and/or an absolute minimum only at a single position and, if necessary, local maxima and/or minima at further positions in the overall intensity distribution with respect to the particular environment or in a specific intersection direction or along a specific intensity profile curve, so that the overall intensity distribution has the above-mentioned features according to the invention.

Preferably, the energy beam source system of the irradiation device is then designed and/or the irradiation device has an energy beam modulation unit such that the second energy beam is intensity modulated in the desired manner. For this purpose, the irradiation device can have a control device which controls the energy beam source system, in particular the second energy beam source, if this is operated separately from the first energy beam source, and/or the energy beam modulation unit accordingly.

In principle, the first energy beam and the second energy beam themselves can have any intensity distributions. Preferably, they have qualitatively and/or quantitatively different intensity distributions, very particularly preferably not only quantitatively but also qualitatively, i.e. completely different forms. What is decisive is that ultimately the (time-integrated) overall intensity distribution generated in this way has the above-mentioned features according to the invention.

In a particularly preferred variant, the first energy beam has an intensity distribution that is substantially rotationally symmetrical (i.e. within the usual tolerances) with respect to a beam axis.

The first energy beam particularly preferably has a so-called "top-hat" or "flat-top" intensity distribution. Such an intensity distribution is characterised in that it has a spatially relatively homogeneous intensity distribution across the beam cross-section, i.e. a relatively smooth, flat surface with a relatively sharp edge. In cross-section through the beam axis, such a "top-hat" or "flat-top" intensity distribution shows a rectangular profile. Such a profile can be described by a Heaviside function (step or jump function).

With a top-hat intensity distribution, a defined relatively homogeneous basic intensity can be ensured within the combination energy beam, i.e. within the overall intensity distribution. Moreover, suitable beam-shaping units are already available for such top-hat intensity distributions, for example diffractive optical elements (DOEs).

Particularly preferably, the second energy beam also has an intensity distribution that is substantially rotationally symmetrical with respect to a beam axis, i.e. within the usual tolerances. This second energy beam can, for example, particularly preferably have a Gaussian intensity distribution. Such a Gaussian intensity distribution usually does not require beam shaping, since most energy beam sources, in particular lasers, as mentioned, already generate a beam with a Gaussian intensity distribution.

By combining a first energy beam with a top-hat intensity distribution to provide the homogeneous basic intensity in the overall intensity profile and a second energy beam with a Gaussian intensity distribution moving very fast relative to it within the overall intensity distribution, almost any overall intensity distributions can be generated within the combination energy beam.

Preferably, the second energy beam is "smaller" or "finer" than the first energy beam, i.e. the second energy beam has a smaller maximum beam extent than the first energy beam, especially when it is coupled into the common beam path by the energy beam movement unit (i.e. at the coupling point, for example on the first scanner mirror of a conventional scanner system).

A beam extent in this sense is understood to mean any dimension or distance transverse (to the beam axis) through the beam, that is to say for example a beam diameter or a beam width, with a beam width always being understood to mean the extent perpendicularly to the current direction of movement of the area of incidence on the build field. The distance does not necessarily have to run through the beam axis or the centre of the (overall) intensity distribution, especially if the energy beam does not have a rotationally symmetrical intensity distribution. The beam extent is defined here in such a way that it runs along the defined path from an edge—as defined above—(i.e. that 99% of the radiant power of the energy beam is within the area enclosed by the edge) to the opposite edge of the intensity distribution.

For example, the beam extent of the first energy beam may be at least 500 µm, preferably at least 700 µm, further preferably at least 900 µm, even further preferably at least 1000 µm, even further preferably at least 1100 µm, even further preferably at least 1200 µm, even further preferably at least 1500 µm, particularly preferably at least 2 mm. Alternatively or additionally, the maximum beam extent of the first energy beam is at most 10 mm, preferably at most 6 mm, further preferably at most 4 mm, particularly preferably at most 3 mm.

The beam extent of the second energy beam, which is moved relative to this first energy beam or is preferably moved within the beam extent of the first energy beam, is at least 20 µm, preferably at least 50 µm, particularly preferably at least 80 µm. However, this maximum beam extent of the second energy beam is at most 300 µm, preferably at most 200 µm, particularly preferably at most 100 µm.

A ratio of the beam extent of the second energy beam to the beam extent of the combined energy beam and/or the first energy beam is in this case preferably at most 1:3, further preferably at most 1:5, even further preferably at most 1:10, even further preferably at most 1:20.

In the case of a substantially circular shape of the first and second as well as the combined energy beam, the ratio of the diameter of the second energy beam to the diameter of the combined energy beam and/or to the diameter of the first energy beam is preferably at least 1:100, particularly preferably at least 1:50.

Very particularly preferred is a combination in which the beam extent, for example a diameter, of the first energy beam and thus also the beam extent or diameter of the combination energy beam is 1000 µm (with a top-hat intensity distribution) and the second energy beam (with a Gaussian intensity distribution) has a beam extent, for example a beam diameter, of 80 µm.

Preferably, as mentioned, the relative movement of the second energy beam with respect to the first energy beam takes place cyclically, i.e. the same position is repeatedly approached by the second energy beam within the combination energy beam on a closed curve. In particular, in the case of a straight, purely translatory scanning movement of the combination energy beam, the same position (relative to the first energy beam) is particularly preferably passed at equal time intervals during the relative movement of the second energy beam.

Additionally or alternatively, the intensity is also cyclically modulated accordingly by controlling the power of the second energy beam. For example, the control signal for intensity modulation of the second energy beam, preferably a generator signal for a second energy beam source which generates the second energy beam, can be formed as a sinusoidal signal or similar. In this way, a cyclic intensity modulation is automatically achieved.

The intensity modulation is particularly preferably carried out with a smooth and periodic control signal. Preferably, the function of the control signal corresponding to the above-mentioned function of the intensity values along the intensity profile curve can be differentiated at least once at each point, further preferably can be differentiated at least twice, particularly preferably can be differentiated any number of times. An ideal target control signal can, for example, be approximated or exactly mapped by trigonometric functions such as a sine or cosine signal or a linear combination of trigonometric functions. Similarly, any other control program or algorithm that periodically repeats a function defined over a revolution (for example from $-\pi$ to $+\pi$) could also be used.

A possible generator signal to modulate the second energy beam could, for example, be described by means of the following function:

$$u(t) = A\cos\left(\frac{\omega t + \theta(t)}{2}\right)^{2n} + c$$

Here, A is the difference between the local minimum value and the local maximum value, w stands for the angular velocity of a rotation of the second energy beam about its virtual rotation axis, t denotes the time, $\theta(t)$ denotes the above-mentioned (time-dependent) phase shift for a shift of the minima and maxima on the intensity profile curve, the number n in the exponent is a natural number, and c represents a constant. By increasing the exponent n the intensity profile curve can be made to slope more steeply from the local maximum value to both directions.

A shift in the maximum and minimum values of the intensity of the second energy beam along its (relative) path of movement can be achieved by a phase shift of the periodic control signal.

The first energy beam source and/or the first energy beam movement unit and/or an energy beam modulation unit can be designed and controlled accordingly by a control device to ensure such a cyclic relative movement or intensity modulation.

Particularly preferably, the relative movement and/or the intensity modulation of the second energy beam take place uniformly, in particular during a straight, purely translatory scanning movement of the combination energy beam. With regard to the relative movement, this means that the amount of the relative speed remains the same and does not change during the movement, but only the direction of movement; with regard to the intensity modulation, this means that the modulation is stepless.

Very particularly preferably, the second energy beam moves along the edge of the intensity distribution of the first energy beam. Preferably, this is done in such a way that at least one maximum of the intensity distribution, i.e. the centre in the case of a Gaussian profile, of the second energy beam moves within an area of the first intensity distribution bounded by the edge. Particularly preferably, it is ensured that the edge of the overall intensity distribution of the combination energy beam substantially coincides with the edge of the intensity distribution of the first energy beam, or that they are at least relatively close to each other, for example <20 µm, so that the overall diameter of the combination energy beam is substantially defined by the diameter of the first energy beam. Preferably, the dimensional difference between the edge of the overall intensity distribution of the combination energy beam and the edge of the intensity distribution of the first energy beam is at most approximately 40%, further preferably at most approximately 25%, particularly preferably at most approximately 15%, of a beam extent of the second ("smaller") energy beam. Preferably, at least one maximum of the intensity distribution of the second energy beam lies within the intensity distribution of the first energy beam.

Preferably, the second energy beam moving relative to the first energy beam contributes 99% of its energy in the edge region of the overall intensity distribution.

This procedure, in which the second energy beam is moved along a circular path along the edge or within the edge of the intensity distribution of the first energy beam, is particularly preferred if the first energy beam has a rotationally symmetrical or circular intensity distribution and very particularly preferably a top-hat intensity distribution.

A combination energy beam generated in this way then exhibits—with suitable intensity modulation of the first energy beam with a sinusoidal signal adapted to the period of the cyclic relative movement—a (time-integrated) overall intensity distribution that satisfies the criteria according to the invention given above.

In order to achieve such a relative movement of the second energy beam relative to the first energy beam along a closed path, in particular a circular path, in the case of an optical energy beam, for example a laser beam, a rotating optical element, for example a beam shift element or a reflector, in particular a so-called flat plate and/or a mirror, can preferably be used. That is to say, the first energy beam movement unit preferably comprises a rotating unit with a suitable rotatable optical element. This optical element may, for example, be driven by a suitable motor, and the rotation may be relatively fast, namely such that, in terms of magnitude, the desired fast rotation or movement of the second energy beam relative to the scanning speed is achieved. For example, the rotation of the optical element could take place with a radius of a circular movement of a second energy beam running parallel to the virtual beam axis of 2 mm and a movement speed (that is to say its path speed on its cyclic path) of 5 m/s with approximately 400 revolutions per s, with a movement speed of the second energy beam of 31 m/s with approximately 2500 revolutions per s, with a movement speed of the second energy beam of 50 m/s with approximately 4000 revolutions per s.

Preferably, the beam path of the second energy beam can thus be deflected by such a rotation unit with a rotatable optical element and further optical elements of the energy beam movement unit in such a way that it rotates on a "virtual cylinder surface" about a "virtual rotation axis" and always runs parallel to this virtual rotation axis. This virtual rotation axis then corresponds to the virtual beam axis defined above or the virtual beam path of the second energy beam.

There are various possibilities for the specific realisation of such rotation units. Examples of this will be given later.

Preferably, the energy beam movement unit is designed in such a way that the distance between the actual beam axis and the virtual beam axis of the second energy beam, i.e. the diameter of the "virtual cylinder surface", is adjustable.

Preferably, the control data are generated with determination of further process parameters (in addition to the intensity distribution of the energy beam or combination energy beam) and optionally according to the particular position of the area of incidence in the component in such a way, i.e. the intensity distribution, that is to say the beam extent and/or "shape" at the area of incidence of the energy beam on the build field, and further process parameters are optimised and determined in such a way, that when the device is controlled using said control data, a melting of the build-up material within a target region in and around the area of incidence is effected by means of heat conduction welding. A "target region" in this context means on the one hand the area of incidence, i.e. the region in which the energy beam impinges on the surface, but also the region below it, i.e. into the depth of the material or the layer, and possibly also an environment around this area of incidence in which the energy beam still has an effect, e.g. due to heat conduction in the build-up material.

These further process parameters can include, for example, the absolute beam intensity, the speed of movement of the area of incidence on the build field, i.e. the scanning speed, but also the layer thickness and the exact irradiation strategy, i.e. for example in which pattern the irradiation takes place. Likewise, other diverse parameters can be taken into account, in particular material characteristics of the build-up material, and certain optimisation criteria and/or secondary conditions and/or constraints can be defined in order to then calculate an optimal local target temperature distribution in the target region in which the build-up material is to be melted and, in turn, the optimal (if necessary, also time-integrated overall) intensity distribution, from which the control data for controlling the irradiation device and/or further components of the manufacturing device for additive manufacturing are then generated and used in the manufacturing process.

Preferably, the (overall) intensity distribution of the energy beam or combination energy beam (if this is generated by superimposing energy beams) can be monitored and/or controlled. Particularly preferably, the data acquired during the monitoring and/or control are used for a control of the (overall) intensity distribution, for example as an actual intensity distribution, which can be compared with a target intensity distribution.

Accordingly, the irradiation device preferably has a suitable monitoring and/or control device (hereinafter also referred to as the "monitoring device").

Such a monitoring device can be realised, for example, with the aid of a beam splitter arranged in the beam path of the energy beam or combination energy beam, which beam splitter, for example, branches off a small part of the intensity of the (combination) energy beam into a monitoring unit for measuring and checking the (overall) intensity distribution of the (combination) energy beam. The monitoring unit can, for example by means of an area sensor or the like, acquire an integral image/signal of the (overall) intensity distribution.

Insofar as a combination energy beam is to be monitored, which is generated by superimposing energy beams, the "exposure time" of the area sensor is preferably adapted to the integration time period defined above and/or an incomplete exposure of the sensor (at least one complete rotation of the second energy beam as well as a fraction of one or more further revolutions) is compensated for by a filter, for example an evaluation algorithm.

In the context of a monitoring of the (overall) intensity distribution, an actual intensity distribution, for example, an actual rotation of the overall intensity distribution can be compared with a target rotation and/or an actual distribution can be compared with a target distribution of the (overall) intensity distribution. By means of an additional control loop, the actual setting in question can be readjusted if necessary.

BRIEF DESCRIPTION OF THE DRAWINGS

The invention is explained in greater detail below with reference to the accompanying figures on the basis of embodiment examples. In the various figures, like components are provided with like reference numbers. In the figures.

DETAILED DESCRIPTION OF THE EMBODIMENTS

The following embodiment examples are described with reference to a device 1 for the additive manufacture of manufacturing products in the form of a laser sintering or laser melting device 1, it being explicitly pointed out once again that the invention is not limited to laser sintering or laser melting devices. The device will therefore be referred to in the following—without any limitation of generality—as a "laser sintering device" 1 for short.

Figure 1:
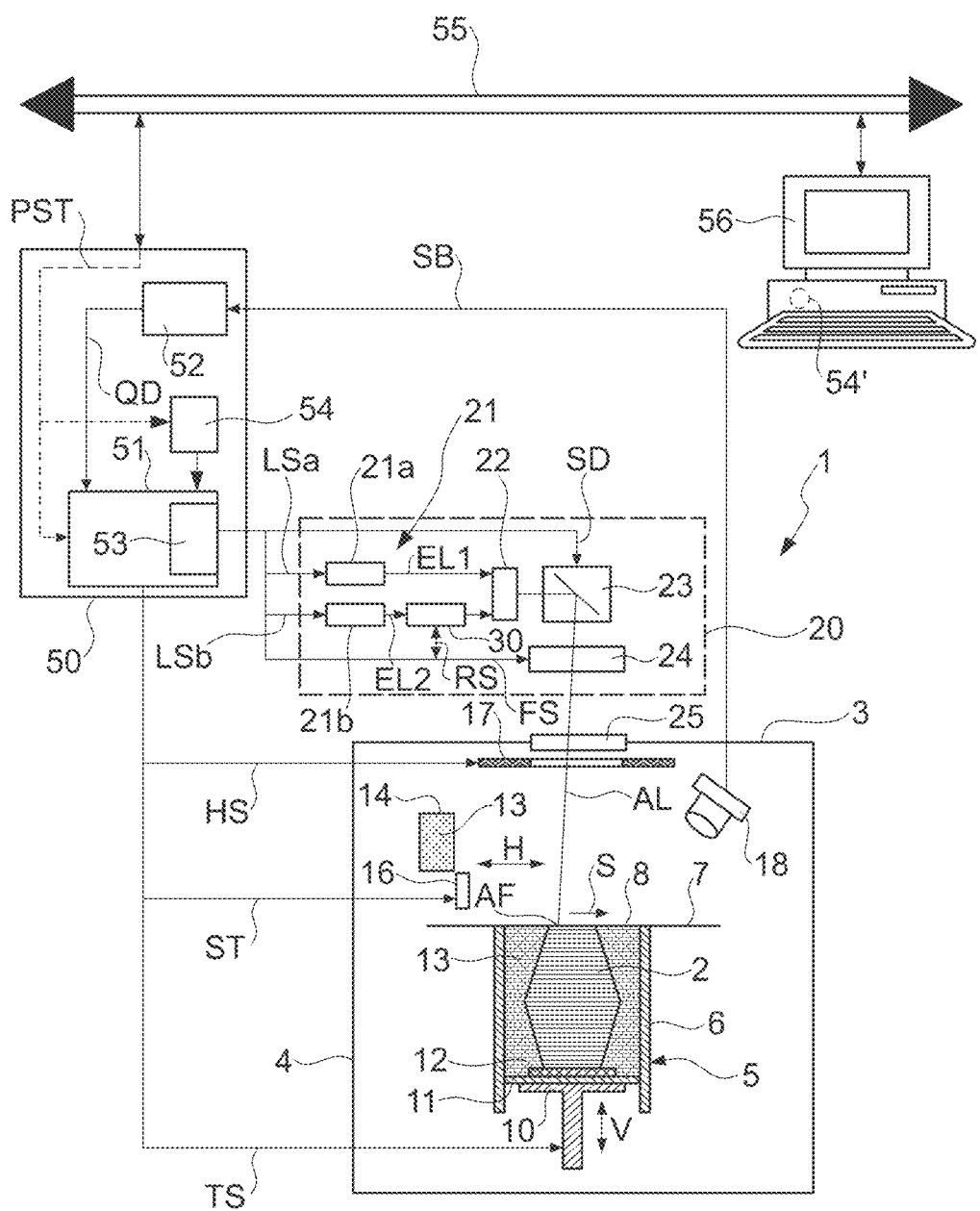
FIG. 1 shows a schematic, partially sectional view of an embodiment example of an additive manufacturing device with an energy beam modification device usable for the invention.

Such a laser sintering device 1 is shown schematically in FIG. 1. The device has a process chamber 3 or a process area 3 with a chamber wall 4, in which the manufacturing process fundamentally takes place. An upwardly open container 5 with a container wall 6 is located in the process chamber 3. The upper opening of the container 5 in each instance forms the current working plane 7. The region of this working plane 7 located within the opening of the container 5 can be used to build the object 2 and is therefore referred to as the build field 8.

The container 5 has a base plate 11 which is movable in a vertical direction V and is arranged on a support 10. This base plate 11 closes the container 5 at the bottom and thus forms its base. The base plate 11 may be formed integrally with the support, but it may also be a plate formed separately from the support 10 and fixed to the support 10 or simply mounted thereon. Depending on the type of specific build-up material, for example the powder used, and the manufacturing process, a build platform 12 may be attached to the base plate 11 as a build base on which the object 2 is built. In principle, however, the object 2 can also be built on the base plate 11 itself, which then forms the building base.

The basic construction of the object 2 is achieved by first applying a layer of build-up material 13 to the build platform 12, then—as explained later—selectively solidifying the build-up material 13 by irradiating it with a laser at the points which are to form parts of the object 2 to be manufactured, then lowering the base plate 11, thus the build platform 12, with the aid of the support 10, and applying a new layer of build-up material 13 and then selectively solidifying it. This process is repeated until all layers of the at least one object are solidified. In FIG. 1, the object 2 built in the container on the building platform 12 is shown below the working plane 7 in an intermediate state. It already has a number of solidified layers, surrounded by build-up material 13 which has remained unsolidified. Various materials can be used as build-up material 13, preferably powder, in particular metal powder, plastic powder, ceramic powder, sand, filled or mixed powder or also pasty materials.

Powdery build-up material 13 is located in a storage container 14 of the laser sintering device 1. With the aid of a coater 16 movable in a horizontal direction H, the build-up material can be applied in the working plane 7 or within the build field 8 in the form of a thin layer.

Optionally, an additional radiation heater 17 is located in the process chamber 3. This can be used to heat the applied build-up material 13 so that the irradiation device used for the selective solidification does not have to apply too much energy. This means that, for example, a quantity of basic energy can already be introduced into the build-up material 13 with the aid of the radiation heater 17, which energy is of course still below the necessary energy at which the build-up material 13 sinters or even melts. An infrared radiator, for example, can be used as the radiation heater 17.

For selective solidification, the laser sintering device 1 has, as mentioned, an irradiation device 20 or, in this case specifically, an exposure device 20. This irradiation device 20 generates here, as output laser beam AL, a combination energy beam AL (or in the following also referred to as a combination laser beam AL) with a defined modifiable overall intensity distribution GIV (see for example FIG. 2) by combining two energy beams EL1, EL2 and moving the energy beams EL1, EL2 relative to each other by means of a first energy beam movement unit 30, as will be explained in greater detail later.

The combination energy beam AL is then deflected via a subsequent second energy beam movement unit 23 (also referred to as a deflection unit 23 or scanner 23) in order to travel along the exposure paths or tracks provided in accordance with the exposure strategy in the layer to be selectively solidified and in order to selectively introduce the energy. In other words, by means of the scanner 23, the area of incidence AF of the combination energy beam AL on the build field 8 is moved, and the current movement vector or the direction of movement S (scanning direction) of the area of incidence AF on the build field 8 can change frequently and rapidly. In so doing, this laser beam AL is focused on the working plane 7 in a suitable manner by a focusing device 24.

Specifically, the irradiation device 20 here comprises an energy beam source system 21 or laser system 21 for generating a first laser beam EL1 and a second laser beam EL2 by two separate lasers 21a, 21b. Downstream of the laser 21b for the second laser beam EL2, the irradiation device 20 has a first energy beam movement unit 30 for moving the second laser beam EL2 relative to the first laser beam EL1, and an energy beam combination device 22, which is formed and arranged relative to the scanner 23 such that the first laser beam EL1 and the second laser beam EL2 are coupled into a common beam path in the scanner 23 such that they are moved together as a combination energy beam AL over the material 13 or the build field 8. For details regarding the construction of the irradiation device 20, reference is made to FIGS. 4 and 5 with their respective explanations.

Preferably, the lasers 21a, 21b may be gas or solid-state lasers or any other type of laser, such as laser diodes, in particular VCSEL (Vertical Cavity Surface Emitting Laser) or VECSEL (Vertical External Cavity Surface Emitting Laser) or a line of these lasers. Very particularly preferably, one or more single-mode lasers, for example a fibre laser with a power of 3 kW and a wavelength of 1070 nm, may be used within the scope of the invention. The lasers 21a, 21b for the first and second laser beams EL1, EL2 can be identical, but can also be constructed differently.

The irradiation device 20 is here preferably located outside the process chamber 3, and the combination laser beam AL is directed into the process chamber 3 via a coupling window 25 arranged on the upper side of the process chamber 3 in the chamber wall 4.

It should be noted, however, that the invention is not limited to the fact that the energy beam AL with the intensity distribution GIV according to the invention, which ultimately impinges on the build field 8, is generated as a combination energy beam AL by superimposing individual energy beams EL1, EL2, which are moved relative to each other, but that an energy beam AL with an intensity distribution GIV according to the invention could also be generated with the aid of another irradiation device. Nevertheless—without limiting the generality—the following is based on the example of superimposing two energy beams or laser beams EL1, EL2 to generate a combination energy beam AL with a (time-integrated) desired overall intensity distribution GIV.

The laser sintering device 1 further contains a sensor arrangement 18 which is suitable for detecting process radiation emitted during the impingement of the laser beam 22 on the build-up material in the working plane. This sensor arrangement 18 operates here in a spatially resolved manner, i.e. it is able to detect a type of emission image of the particular layer. Preferably, an image sensor or a camera 18 which is sufficiently sensitive in the range of the emitted radiation is used as the sensor arrangement 18. Alternatively or additionally, one or more sensors for detecting an electromagnetic, in particular optical and/or thermal process radiation could also be used, for example photodiodes which detect the electromagnetic radiation emitted by a weld pool under impinging laser beam AL, or temperature sensors for detecting an emitted thermal radiation. It would be possible to assign the signal of a sensor, which itself does not have spatial resolution, to the coordinates by assigning the coordinates, which are used to drive the laser beam, to the sensor signal, in each case in terms of time. In FIG. 1, the sensor arrangement 18 is located inside the process chamber 3. However, it could also be located outside the process chamber 3 and could then detect the process radiation through another window in the process chamber 3.

The signals detected by the sensor arrangement 18 are transferred here as a process area sensor data set or layer image SB to a control device 50 of the laser sintering device 1, which is also used to control the various components of the laser sintering device 1 for overall control of the additive manufacturing process.

For this purpose, the control device 50 has a control unit 51 which controls the components of the irradiation device 20 via an irradiation control interface 53, namely in this case transmits laser control data LSa, LSb to the lasers 21*a*, 21*b*, transmits relative movement control data RS to the first energy beam movement unit 30, transmits scan control data SD to the second energy beam movement unit 23 or the scanner 23, and transmits focus control data FS to the focusing device 24.

The control unit 51 also controls the radiation heater 17 by means of suitable heater control data HS, controls the coater 16 by means of coating control data ST, and controls the movement of the support 10 by means of support control data TS.

In addition, the control device 50 here has a quality data determination device 52, which receives the process space sensor data set SB and determines quality data QD based thereon, which quality data can be transferred to the control unit 51, for example, in order to be able to intervene in the additive manufacturing process in a regulating manner.

The control device 50 is coupled, here for example via a bus 55 or another data connection, to a terminal 56 with a display or the like. Via this terminal 56, an operator can control the control device 50 and thus the entire laser sintering device 1, for example by transmitting process control data PST.

In order to adjust the production process so that the process is carried out, for example, as a heat conduction welding process and not as a deep welding process, the control data can be generated or modified by means of a control data generation device 54, 54'.

This control data generation device 54 can, for example, be part of the control device 50 and be implemented there, for example, in the form of software components. Such a control data generation device 54 integrated in the control device 50 can, for example, take over the process control data PSD and modify it accordingly so that an energy beam AL with the desired intensity distribution GIV is generated, and can then transmit the correspondingly modified control data PSD to the control unit 51. The modified control data PSD can in particular be modified laser control data LSa, LSb, but possibly also other modified control data, such as modified coating control data ST or support control data TS, in order to select a suitable layer thickness. Alternatively, only the laser control data LSa, LSb could be modified in the control data generation device 54 and transferred to the control unit 51 so that the irradiation control interface 53 operates with the modified laser control data LSa, LSb.

However, it would also be possible for the control data generation device 54' to be implemented on an external computer unit, for example here the terminal 56, and to already create process control data PSD with correspondingly suitable exposure control data in advance, with which the device 1 is controlled in such a way that the desired intensity distribution GIV is achieved. In this case, the internal control data generation device 54 present here in the control device 50 could also be dispensed with.

As already mentioned, the process control data PSD generated or modified by the control data generation device 54, 54' can also be regarded as target values which are then used in the control unit 51 for a control process; for example (as one possibility), the quality data QD can be included as actual values.

It is noted once again at this juncture that the present invention is not limited to such a laser sintering device 1. In particular, it can be applied to any other methods for generative or additive production of a three-dimensional object by depositing and selectively solidifying a build-up material, in particular layer by layer, wherein an energy beam for solidification is emitted onto the build-up material to be solidified. Similarly, it could be used for the welding of weld seams or for other processes in which material is to be irradiated with an energy beam, in particular for local melting of the material. Accordingly, the irradiation device can also not only be a laser, as described herein, but any device could be used with which energy can be selectively brought onto or into the build-up material in the form of wave or particle radiation. For example, instead of a laser, another light source, an electron beam, etc. could be used. Likewise, a number of combination energy beams according to the invention can be generated and used in parallel, for example in order to be able to selectively solidify material at a number of positions in the build field at the same time.

Even though only a single object 2 is shown in FIG. 1, it is possible and usually also customary to produce a number of objects in parallel in the process chamber 3 or in the container 5. For this purpose, the build-up material is scanned layer by layer by the energy beam at points which correspond to the cross sections of the objects in the particular layer.

Figure 2:
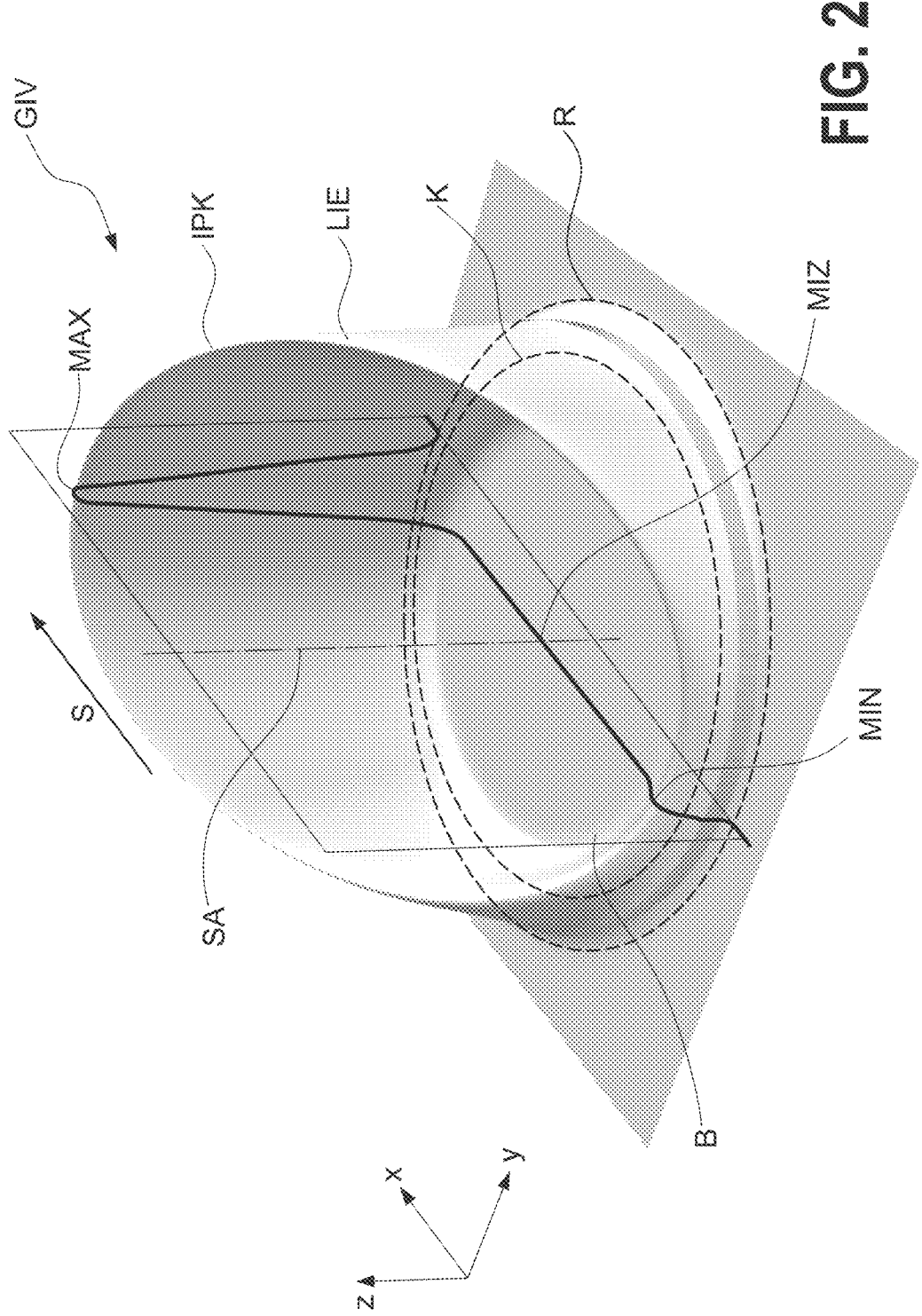
FIG. 2 shows a perspective view of an embodiment example of a preferred (overall) intensity distribution of a combination energy beam according to the invention.

FIG. 2 shows the typical basic form of an overall intensity distribution GIV of a combination energy beam AL, which would be particularly well suited for use in this form or in a somewhat modified form (see also the later explanations regarding FIG. 2 and FIG. 7) in order to keep the melting process of the build-up material 13 in the region of the area of incidence AF of the combination energy beam AL on the build field 8 within the process region of heat conduction welding, i.e. without a vapour capillary being formed as the build-up material melts. The overall intensity distribution GIV of this combination energy beam AL fulfils in particular the conditions according to the invention as defined above.

FIG. 2 shows the overall intensity distribution GIV (hereinafter also referred to as the intensity distribution GIV for short) in a plane x, y perpendicular to the beam axis SA of the combination energy beam AL (hereinafter also referred to merely as an energy beam AL for short), with the intensity in the z-direction being spatially resolved and plotted above this plane x, y. Depending on the angle of incidence of the energy beam AL on the build field 8, slight distortions may occur, which, however, could also be compensated in principle during the generation of the energy beam AL by corresponding control of the individual components, if this is necessary and/or desired.

In a middle region of the overall intensity distribution GIV, i.e. here approximately within half the radius to the edge R of the intensity distribution GIV (which is defined as above so that 99% of the radiant power lies inside the edge R), there is an intensity minimum MIZ (also abbreviated hereinafter as the "minimum"). This minimum MIZ lies here approximately in the centre of the intensity distribution GIV, i.e. approximately on the beam axis SA or the axis of the beam path of the energy beam AL.

In an edge region running around this middle region, i.e. along an intensity profile curve IPK running around inside the edge R, but along the edge, there is a local intensity maximum value MAX (hereinafter also abbreviated as "maximum value") on one side with respect to this intensity profile curve IPK and a local intensity minimum value MIN (hereinafter also abbreviated as "minimum value") diagonally opposite. "Local" is to be understood here in each instance in relation to the function of the intensity values over the locations along the intensity profile curve IPK, which runs parallel to the edge R or concentrically on a circumferential circular path K.

The intensity values on the intensity profile curve IPK along the circular path K run continuously here from the intensity maximum MAX on both sides, i.e. in both directions of rotation, towards the intensity minimum MIN, i.e. they decrease (here continuously) until there. Depending on the type of signal generation, the signal could also be subject to so-called "ringing" or other effects, such as digitisation stages, which could manifest themselves in the intensity profile curve as noise, harmonics, or in the form of other artefacts. The intensity distribution GIV is oriented here in such a way that the maximum value MAX on the intensity profile curve IPK in the scanning direction S (here arbitrarily parallel to the x-direction of the plane) is at the front and the minimum value MIN is at the back.

Figure 3:
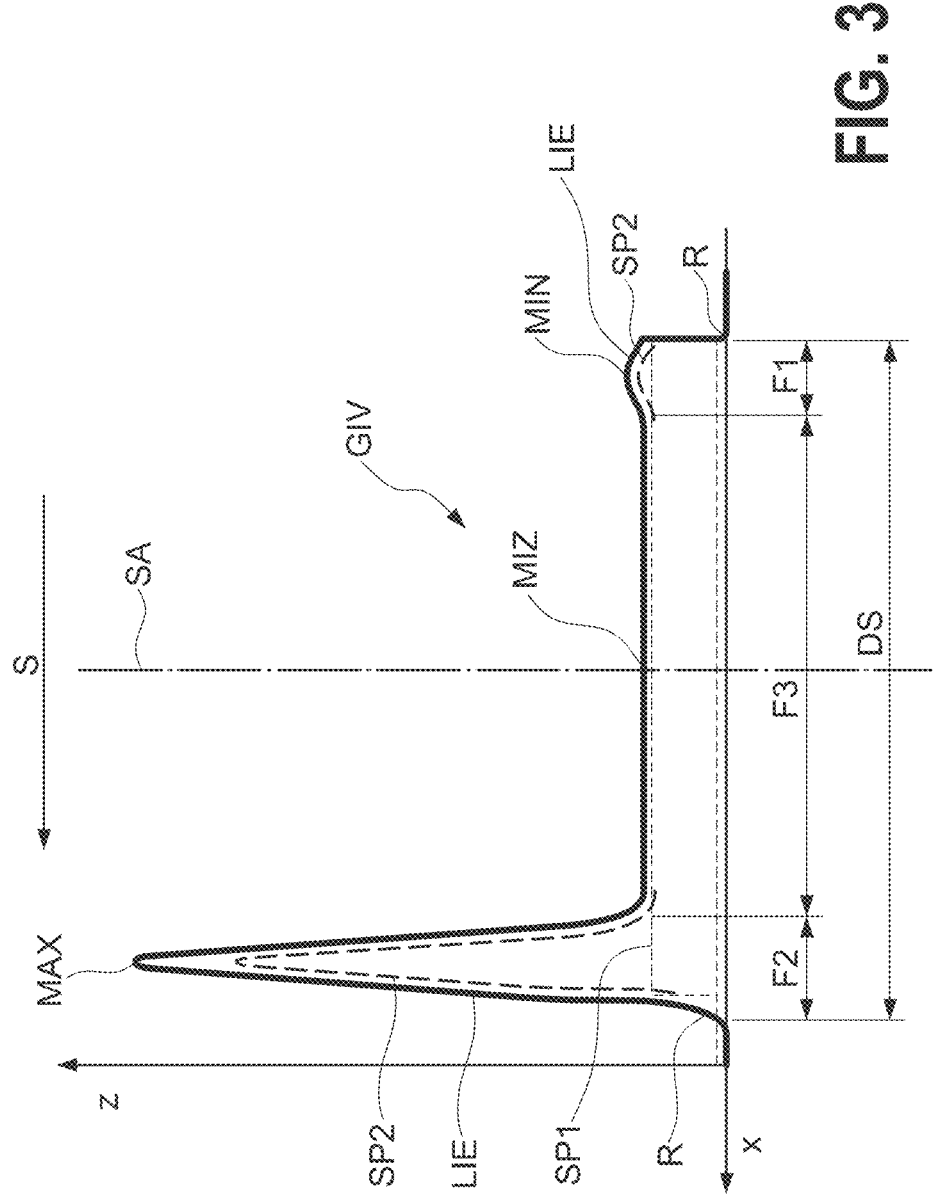
FIG. 3 shows a longitudinal section along the section plane B through the overall intensity distribution according to FIG. 2.

FIG. 3 shows a longitudinal section through this overall intensity distribution GIV in a section plane B extending in the scanning direction S (i.e. in the x/z direction), as shown in FIG. 2. In FIG. 2, the same longitudinal section as in FIG. 3 is shown in simplified form in the section plane B for illustration purposes.

Here, too, the maximum MAX is clearly visible at the front in the scanning direction S and the minimum MIN at the rear end, which, however, again forms a local maximum in relation to its surroundings along the longitudinal section in FIG. 3, since the intensity of the intensity distribution GIV drops sharply outwardly towards the edge R and the minimum MIZ is located in the middle, i.e. towards the centre.

In order to explain the advantageous effect of the intensity distribution GIV for setting a certain target temperature in the build field 8 in the region of the area of incidence, at which temperature it is possible to keep the melting process within the process window of the heat conduction welding, the intensity distribution GIV is divided virtually into three functional regions F1, F2, F3 (see FIG. 3) in the following. The entire intensity distribution GIV basically determines an "effective range", which may be limited, for example, by the edge R of the intensity distribution GIV, but may also extend somewhat beyond it. These terms can be defined as follows:

The overall intensity distribution GIV impinges on an area of incidence AF, which is moved on a build field 8, as has already been explained a number of times above. At least in partial regions of the area of incidence AF of the combination energy beam AL, a melting of the build-up material 13 is caused. In order to achieve the process window of heat conduction welding in the melting region as far as possible, the overall intensity distribution GIV must be adjusted in such a way that it fulfils various tasks.

In the following description, it is assumed that the observer moves with the area of incidence AF. From the observer's point of view, new material 13 is transported into the area of incidence AF at any time during the movement of the area of incidence AF on the build field 8. This build-up material 13 is usually colder than the weld pool. Therefore, the build-up material 13 must first be heated. This task is performed by a first functional region F2 "heat", which generally has the highest intensities of all differentiated functional regions F1, F2, F3 of the intensity distribution GIV. In FIG. 3 this is, accordingly, the front region of the intensity distribution GIV with the absolute maximum MAX. Here, it is evident wherever the intensity distribution GIV in the movement over the build-up material first encounters unsolidified build-up material or build-up material that has solidified in the course of an earlier irradiation or melting process.

At the edge of the area of incidence AF, heat is transported away mainly by conduction into the surrounding build-up material 13. These losses should preferably be compensated. This compensation can be realised in the preferred intensity distribution GIV by the functional region F1 "hold". This functional region F1 "hold" forms a kind of (in plan view lateral) border of the entire intensity distribution GIV and is characterised in FIGS. 2 and 3 by an increase in intensity compared to the immediately adjacent area of incidence. In other words, this is the circular region of increased intensity running along the edge R inside the edge over the intensity profile curve IPK.

In the region lying in front in the scanning direction S, this functional region F1 "hold" merges into the functional region F2 "heat". Since after passing the area of incidence AF on the build field 8 the build-up material 13 is to harden again locally, it makes sense that the minimum MIN is located in the functional region F1 "hold" on the intensity profile curve IPK in the rear region in the scanning direction S.

The region of the overall intensity distribution GIV, which is surrounded by the functional regions F1, F2 "hold" and "heat", has the task of setting the temperature profile in the effective region, i.e. in the melt, and controlling it in such a way that, for example, the desired process region of the heat conduction welding can be maintained. This is performed by the functional region F3 "shape".

The transition between the functional regions F1, F2, F3 is continuous, and the functional regions F1, F2, F3 can overlap or superimpose in some areas. As can be seen here, the intensity distribution GIV in the functional region F3 "shape" is basically a (flat) convex function, whereas the other functional regions F1, F2 have a concave function curve in cross section.

Such a preferred overall intensity distribution GIV can be achieved, as already described above, by a combination energy beam AL, which is generated from two energy beams EL1, EL2 by superimposition, with the energy beam EL2 being moved at a high velocity in terms of magnitude relative to the first energy beam EL1, in relation to the magnitude of the scanning velocity.

The (overall) intensity distribution shown in FIGS. 2 and 3 can be achieved quite specifically by generating a first energy beam EL1 with a first intensity distribution SP1, which corresponds to a so-called top-hat-shaped intensity distribution SP1, and substantially superimposing on this a Gaussian-shaped second intensity distribution SP2 of the second energy beam EL2 running around over the circular path K along the edge R of the intensity distribution SP1 of the first energy beam EL1. In this case, the beam extent, here the diameter, of the intensity distribution SP2 of the second energy beam EL2 is considerably smaller than the beam extent DS, here the diameter DS, of the intensity distribution SP1 of the first energy beam EL1. For example, the first energy beam EL1 may have a diameter of approximately 1000 µm, and the second energy beam EL2 may have a diameter of approximately 80 µm. The top-hat beam EL1 here provides a "basic intensity" on the area of incidence AF. With the Gaussian beam EL2 moving over the circular path K around the centre of the top-hat beam, the local intensity increase LIE (i.e. limited to a region along the circular path K) along the edge R of the overall intensity distribution GIV, which can be clearly seen in FIGS. 2 and 3, is achieved.

The second, smaller energy beam EL2 travels here at high speed (relative to the scanning speed) along the circular path K, so that an area of incidence AF on the build field 8 is exposed to the overall intensity distribution GIV in a time-integrated manner (as mentioned over a period of time with a certain duration, for example over a period), as shown in FIG. 2 and FIG. 3.

In order to ensure that the intensity on the intensity profile curve IPK in the scanning direction S has the maximum MAX at the front and the minimum MIN in the rear region and continuously decreases or increases in between, the intensity of the second energy beam EL2 must be modulated in a manner synchronised to the travel speed.

In principle, one or each of the functional regions F1, F2, F3 could also be plateau-shaped, so that the intensity distribution along the boundaries between the functional regions F1, F2, F3 is graded, for example. However, a forming of functional regions by means of curved intensity profiles or a design of the combined intensity distribution as a superimposition of different intensity profiles, as shown in FIGS. 2 and 3, is usually technically easier and more cost-effective to implement.

With the aid of FIGS. 4 to 6, examples will now be explained with which such a combination energy beam AL can be generated in a particularly simple and cost-effective manner.

Figure 4:
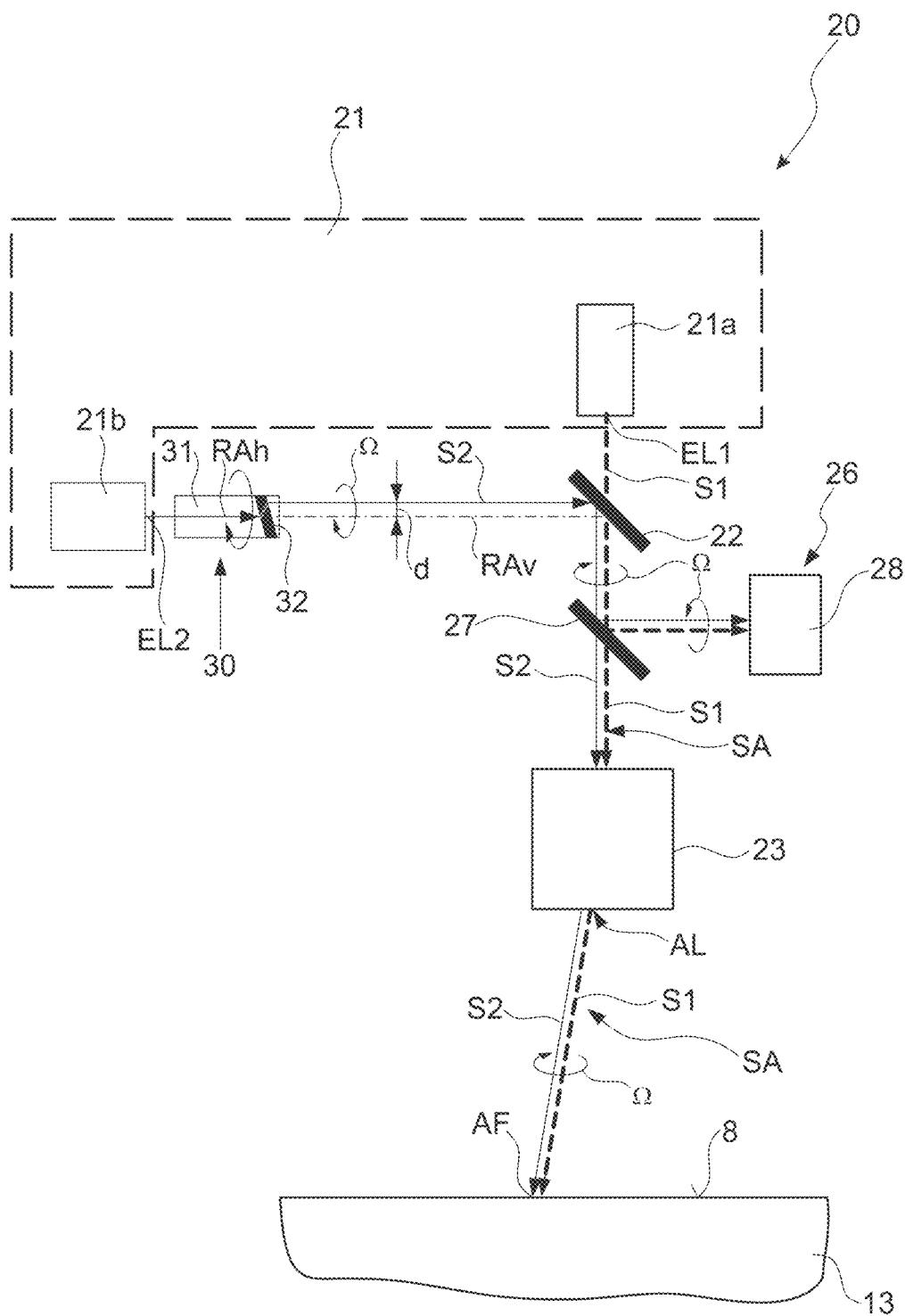
FIG. 4 shows a schematic representation of the functional arrangement of the components of a first embodiment example of an irradiation device usable for the invention.

In the first embodiment example according to FIG. 4, the irradiation device 20 has an energy beam source system 21 with two individual lasers 21a, 21b. The first laser 21a generates a laser beam EL1 as the first energy beam EL1 and is designed or provided with a beam shaping device such that the first laser beam EL1 has the desired top-hat intensity distribution. The second laser 21b is designed to generate a laser beam EL2 with a Gaussian intensity distribution as a second energy beam EL2. In the following, the terms "laser beam" and "energy beam" are therefore used synonymously—without limitation of generality.

This second laser beam EL2 is first radiated through a first energy beam movement unit 30, which provides for the movement of the second laser beam EL2 relative to the first laser beam EL1. The first energy beam movement unit 30 here comprises a hollow shaft 31 which rotates at a rotational speed Ω about a rotational axis RAh which corresponds to the longitudinal axis of the hollow shaft 31. To drive the hollow shaft 31, it is equipped with a corresponding motor (not shown).

The beam path S2 or the beam axis S2 of the second laser beam EL2 runs in such a way that the laser beam EL2 is irradiated directly on the rotation axis RAh into the hollow shaft 31. An optical element 32, more precisely a transmissive beam shift element 32, is arranged in the hollow shaft 31 or at its end and laterally shifts the Gaussian-shaped laser beam 21B by a distance or an axial distance d from the rotation axis RA. In the embodiment example shown, the transmissive beam shift element 32 is a flat plate 32. Due to the rotation of this flat plate 32 on the hollow shaft 31, the Gaussian-shaped second laser beam EL2 or its beam axis S2 always moves parallel to the rotation axis RAh, but on a circular path which runs at an axial distance d around the rotation axis RAh. Integrated over one revolution over the circular path, a (virtual) "averaged beam axis" or an "averaged beam path" of the second laser beam EL2 would lie exactly on the rotation axis RAh, as already defined above.

This rotating second energy beam EL2 is then combined with the first energy beam EL1 in a beam combiner 22, in this case a polariser 22 (for example a thin-film polariser 22) of the energy beam combination device 22, with care being taken to ensure that the virtual rotation axis RAv about which the second energy beam EL2 rotates, i.e. the "averaged beam axis" of the second laser beam EL2, runs behind the beam combiner 22 coaxially to the beam axis S1 of the first energy beam EL1.

The axial distance d by which the beam axis S2 of the second energy beam EL2 is shifted relative to the rotation axis RA ultimately determines the radius of the intensity profile curve IPK in the overall intensity distribution GIV of the combination energy beam AL (see FIG. 2) around the beam axis SA, i.e. the radius of the circular path K. The axial distance d is in this case the distance between the virtual rotation axis RAv of the second energy beam EL2 and the centre of the second intensity distribution SP2, so that here a diameter of the overall intensity distribution GIV is slightly greater than twice the axial distance d.

Since the beam path S1 of the first laser beam EL1 and the "averaged beam path" of the second energy beam EL2 run coaxially here, both laser beams EL1, EL2 are thus coupled into the scanner 23, for example onto the first scanner mirror of the scanner, on a common beam path. Therefore, the laser beams EL1, EL2 are coordinated and superimposed on each other as a combination energy beam AL at the area of incidence AF on the build field 8 and are moved over the material 13 with the scanning speed and scanning direction specified by the scanner 23. The scanning movement does not in itself influence the relative movement of the second energy beam EL2 within the combination energy beam AL. However, it can be advantageous to modify the movement, for example the movement speed, of the second laser beam EL2 relative to the first laser beam EL1 or an intensity modulation of the second laser beam EL2 depending on the scanning movement, i.e. the scanning direction and/or scanning speed.

Figure 5:
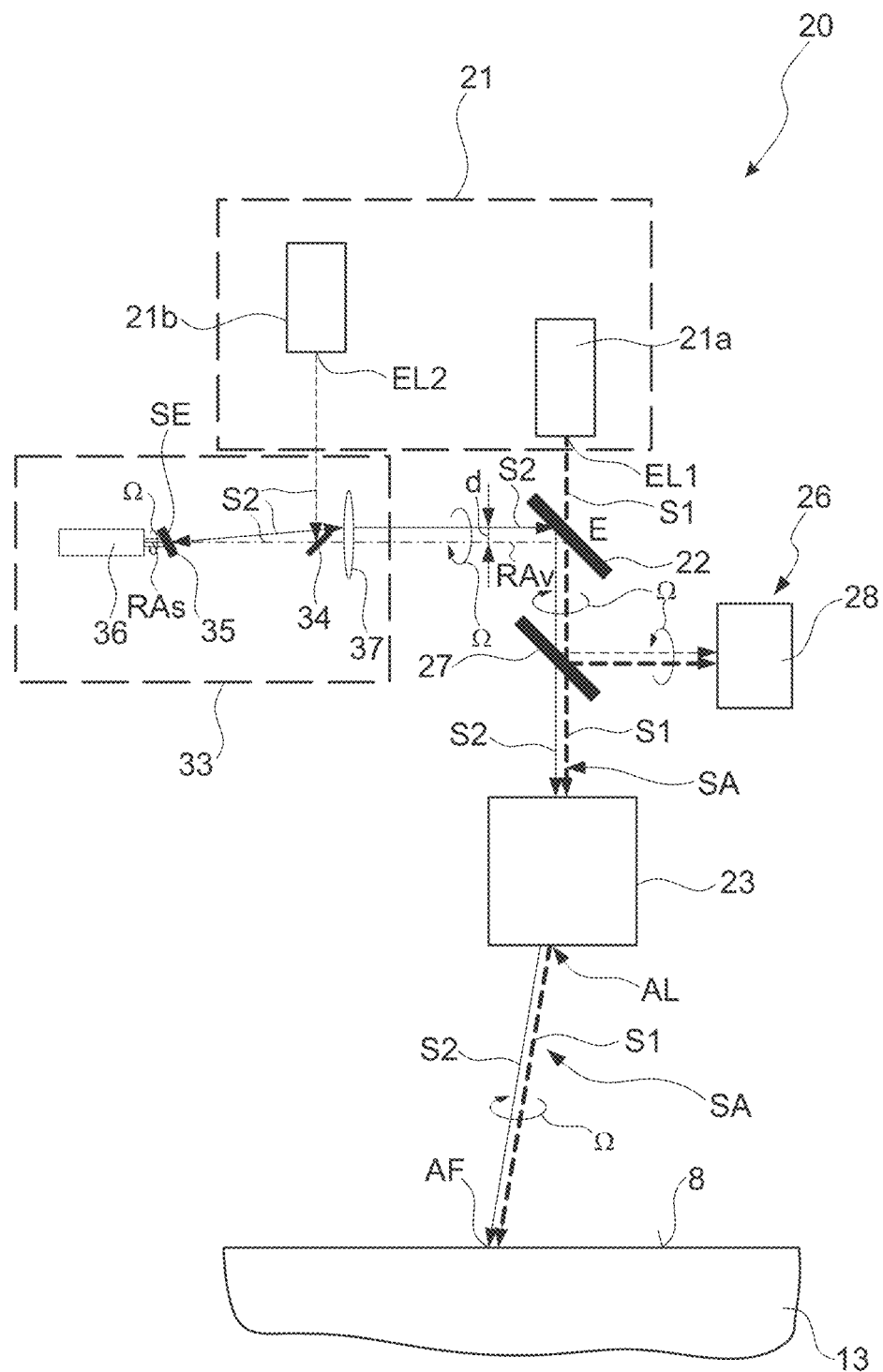
FIG. 5 shows a schematic representation of the functional arrangement of the components of a second embodiment example of an irradiation device usable for the invention.

FIG. 5 shows a further embodiment example of the irradiation device 20, with which a corresponding combination energy beam or combination laser beam AL can be generated as an alternative to the embodiment in FIG. 4. Also in this embodiment example, the irradiation device 20 has an energy beam source system 21 with two separate lasers 21a, 21b for the first energy beam or laser beam EL1 and the second energy beam or laser beam EL2. Here, too, the first laser beam EL1 is generated with a top-hat intensity distribution and forwarded directly to a beam combiner 22.

However, the first energy beam movement unit 33 is constructed differently here than in the embodiment example according to FIG. 4. Here, the energy beam movement unit 33 comprises a first mirror 34, a further mirror 35 that rotates during operation, and a converging lens 37 as an optical element.

The—again Gaussian—second laser beam EL2 is first emitted onto the first mirror 34 and from there is directed onto the rotating mirror 35, which is oblique to the (incoming) beam path S2 of the irradiated second laser beam EL2, the rotation axis RAs of the mirror 35 being coaxial to the beam path S2 of the incoming laser beam EL2. This rotating mirror 35 is driven by an electric motor 36, which can be controlled in a suitable manner by the control device 50. Since a rotational movement of the mirror 35 as a result of an inclined position of a mirror plane SE leads to a corresponding movement of the mirror surface or mirror plane SE, the beam path S2 of the second laser beam EL2 is deflected in such a way that, starting from the mirror 35, it initially moves over a conical envelope, so that the radius of the circular path increases with increasing distance from the rotating mirror 35. In other words, the beam path S2 of the second laser beam EL2 starting from the rotating mirror 35 is tilted at an angle to the rotation axis RAs of the mirror 35.

As shown in FIG. 5, a converging lens 37 is connected downstream of the rotating mirror 35 in the further beam path as an optical element. Said converging lens is located, along the rotation axis RAs in the beam propagation direction starting from the rotating mirror 35, after the first mirror 34. The angle at which the beam path starting from the mirror 35 runs, as well as the distances between the components 34, 35, 37 and their dimensions, are selected so that the beam path S2 runs past this first mirror 34 in every position of rotation and impinges on the converging lens 37.

The converging lens 37 is oriented here so that its optical axis is coaxial with the rotation axis RA of the rotating mirror 35. Preferably, the converging lens 37 is designed in such a way that the output beams of a laser beam that passes through it in a certain direction run parallel to the rotation axis RA. It thus deflects the incoming second laser beam EL2 moving on a path in the form of a conical envelope or orients it in such a way that the beam path S2 of the second laser beam EL2 runs parallel in the further course after the converging lens 37, namely radially offset at a fixed axial distance d from the (imaginary extended) rotation axis RAs (i.e. a virtual rotation axis RAv).

In this construction, the axial distance d—and thus the radius d of the rotating circular path of the second laser beam EL2 around the rotation axis RA—can be adjusted by changing the distance between the converging lens 37 and the rotating mirror 35 and/or the inclination of the rotating mirror 35. In the event of a change in distance during operation of the irradiation device 20, the converging lens 37 must be supplemented by an optical unit for adjusting its focus. This is the focal point of the converging lens 37 which lies on the side of the converging lens 37 facing the rotatable mirror 35 (i.e. on the input side). This focal point of the converging lens 37 is (within usual tolerances) preferably always in the mirror plane of the rotating mirror 35, moreover in its centre of rotation, during the use of the irradiation device 20 for the solidification of build-up material.

In this embodiment example, too, over a revolution over the circular path, a (virtual) "averaged beam axis" or an "averaged beam path" of the second laser beam EL2 would therefore lie exactly on the rotation axis RAs of the mirror, since this corresponds to the virtual rotation axis RAv about which the second laser beam EL2 rotates. The virtual rotation axis RAv and thus the "averaged beam axis" of the second laser beam EL2 as well as the beam path S1 of the first energy beam EL1 are again aligned here in such a way that they impinge on a beam combiner 22 of the energy beam combining device 22, such that the periodically averaged virtual beam path of the second energy beam EL2 according to the above definition is coaxial with the beam path S1 of the first energy beam EL1 and thus the beam path S2 of the second energy beam EL2 rotates in parallel around the beam path S1 of the first energy beam EL1 with the axial distance d in each case. As in the embodiment example according to FIG. 4, the combination energy beam AL generated in this way can then be coupled into the scanner 23.

Figure 6:
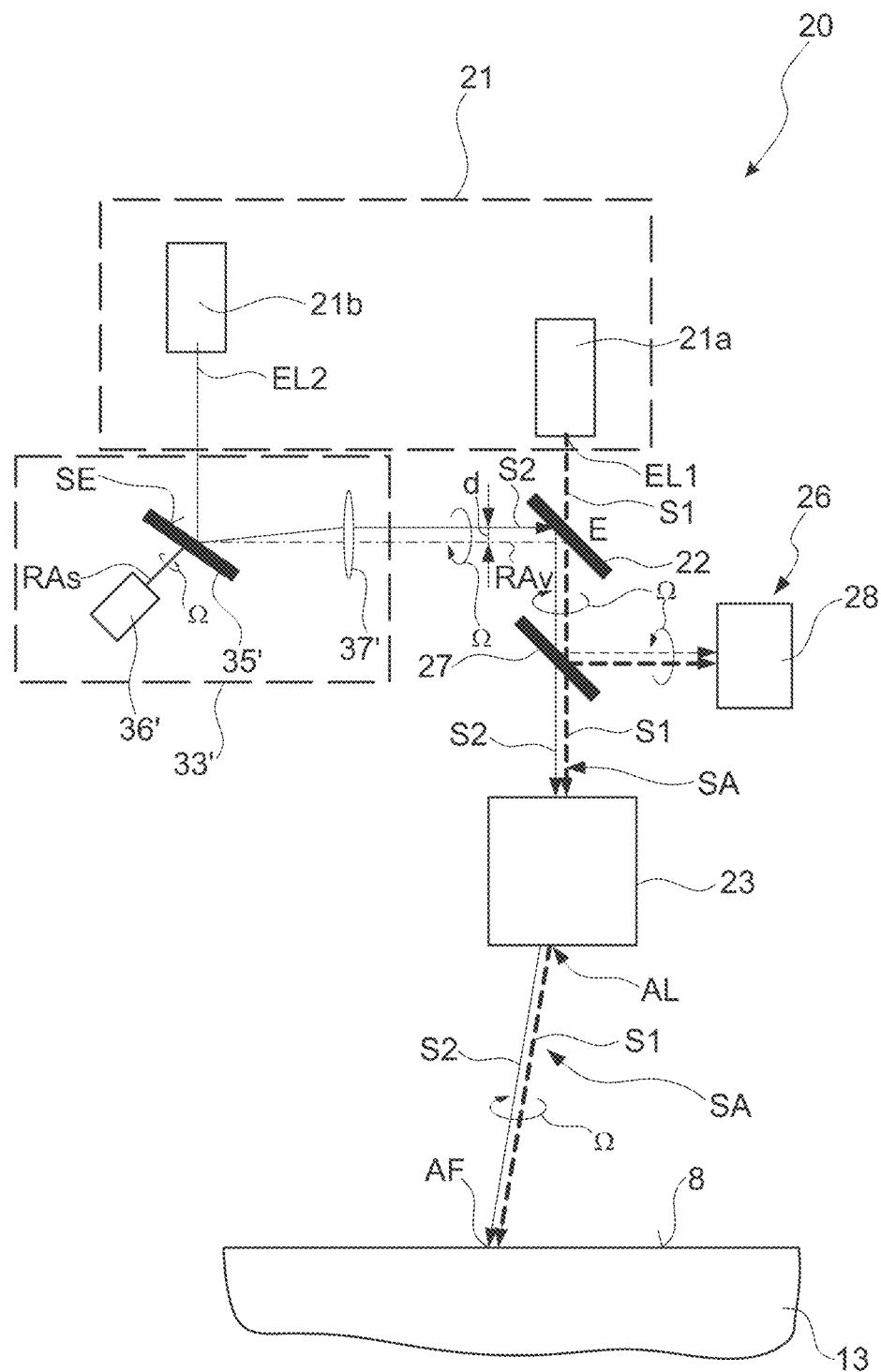
FIG. 6 shows a schematic representation of the functional arrangement of the components of a third embodiment example of an irradiation device usable for the invention.
Figure 6A:
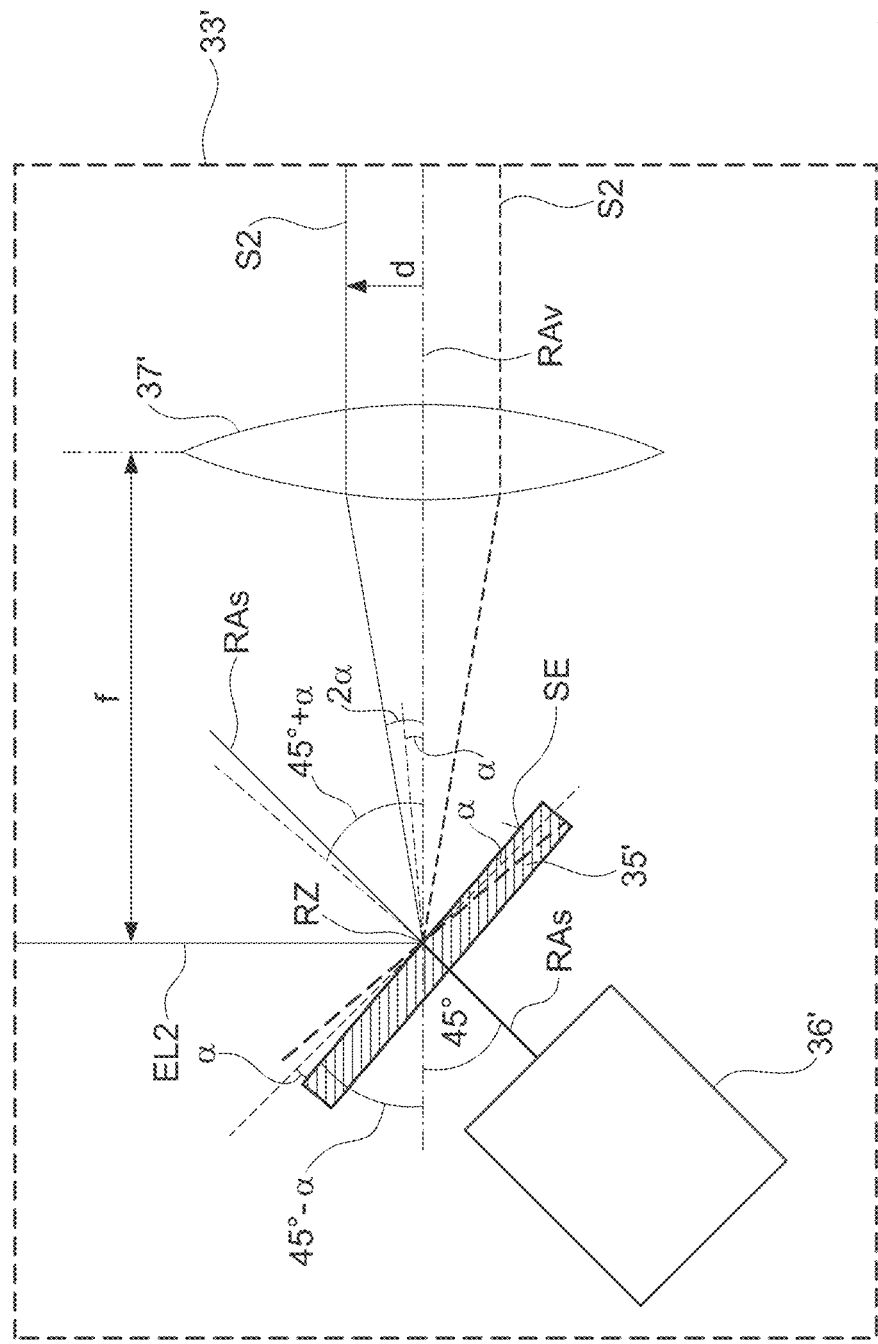
FIG. 6a shows an enlarged schematic representation of the first energy beam movement unit of the irradiation device according to FIG. 6.

A further modification is shown in FIGS. 6 and 6a, with FIG. 6a showing the first energy beam movement unit 33' from FIG. 6 on an enlarged scale to explain the angular positions in greater detail. The construction used here is very similar to the construction in FIG. 5. However, the first energy beam movement unit 33' is constructed here in such a way that the first mirror 34 can be dispensed with. Instead, the rotation axis RAr of the rotating mirror 35' (and the electric motor 36') is now not arranged coaxially to the optical axis of the converging lens 37' as in the embodiment example according to FIG. 5, but is at an angle of 45° to it.

A mirror plane SE of the rotating mirror 35' is additionally tilted at an angle $\alpha$ to a perpendicular to the rotation axis RAs of the mirror 35'. In other words, a periodically averaged (virtual) mirror plane according to the definition given above is twisted around the centre of rotation RZ of the mirror 35' as a pivot point at an angle $\alpha$. This rotation or inclined position can be fixed by fixing the mirror 35' at its rotation axis RAs. Alternatively, it can be variable if the mirror 35 and its rotation axis RAs are mechanically connected to each other, for example by a joint, with said joint being adjustable by an electric motor.

If, as shown, the second laser beam EL2 is then irradiated by the second laser 21b at 90° to the optical axis of the converging lens 37, i.e. also at 45° to the rotation axis RA of the rotating mirror 35, onto the centre of rotation RZ of the rotating mirror 35', it is forwarded from there, tilted at a corresponding angle $2 \cdot \alpha$ to the optical axis of the converging lens 37', onto the converging lens 37. Since a rotational movement of the mirror 35' as a result of an inclined position of the mirror plane SE by the angle $\alpha$ leads to a corresponding movement of the mirror surface or mirror plane SE, the second laser beam EL2 thus initially moves here from the mirror 35' over a conical envelope and is deflected or oriented again by the converging lens 37' in such a way that the beam path S2 of the second laser beam EL2 runs parallel to the optical axis of the converging lens 37' in the further course after the converging lens 37'. For this purpose, the focal point or focus of the converging lens 37' on the input side must lie on the mirror plane SE and in the centre of rotation RZ of the mirror 35'.

In this embodiment, the axial distance d—and thus the radius d of the circular path around the optical axis of the converging lens 37 (i.e. the "virtual rotation axis" RAv about which the second laser beam EL2 rotates) created as a result of the rotational movement of the second laser beam EL2— can be adjusted by changing the inclined position of the rotating mirror 35' (i.e. by an angle $\alpha \pm x$). The requirements described above for the beam path of the second laser beam EL2 are fulfilled if the converging lens 37' is designed or its focal length f is selected in such a way that its focal point on the input side lies on the mirror plane SE and in its centre of rotation RZ, even with a greater or lesser deflection of the second energy beam reflected by the mirror 35', and its focal point on the output side lies at infinity, so that the potential beam paths of an outgoing second laser beam EL2 run parallel to one another.

All other components can be designed and arranged identically in the embodiment examples according to FIGS. 5 and 6 (with 6a).

The irradiation devices 20 shown in all three FIGS. 4 to 6 each comprise here a monitoring device 26. For this purpose, a beam splitter 27 is introduced in the beam path in each case and branches off a small part of the intensity of the combination energy beam AL into a monitoring system 28 for measuring and checking the overall intensity distribution GIV of the combination energy beam AL. The monitoring system 28 may comprise an area sensor that records an integral image/signal of the overall intensity distribution GIV. In this way, for example in the monitoring system 28 or in the control device 50, an actual rotation of the overall intensity distribution GIV can be compared with a target rotation and/or an actual distribution can be compared with a target distribution of the intensity distribution and, if necessary, the relevant actual setting can be readjusted by means of an additional control loop (not shown).

In all embodiment examples previously explained in detail, the rotational speed Ω is selected such that the magnitude of the speed at which the second energy beam EL2 travels on the circular path K in the overall intensity distribution GIV of the combination energy beam AL is high in relation to the corresponding scanning speed S.

In order to achieve the intensity maximum value MAX and the intensity minimum value MIN on the intensity profile curve IPK along the circular path K at the edge R of the top-hat intensity distribution, the intensity of the second energy beam EL2 can be modulated in each case during its movement over the course of the circular path. For this purpose—in particular also in the two constructions according to FIGS. 4 to 6—the power L of the second laser 21b can be modulated in the simplest case with a generator signal GS, as shown in FIG. 7.

Figure 7:
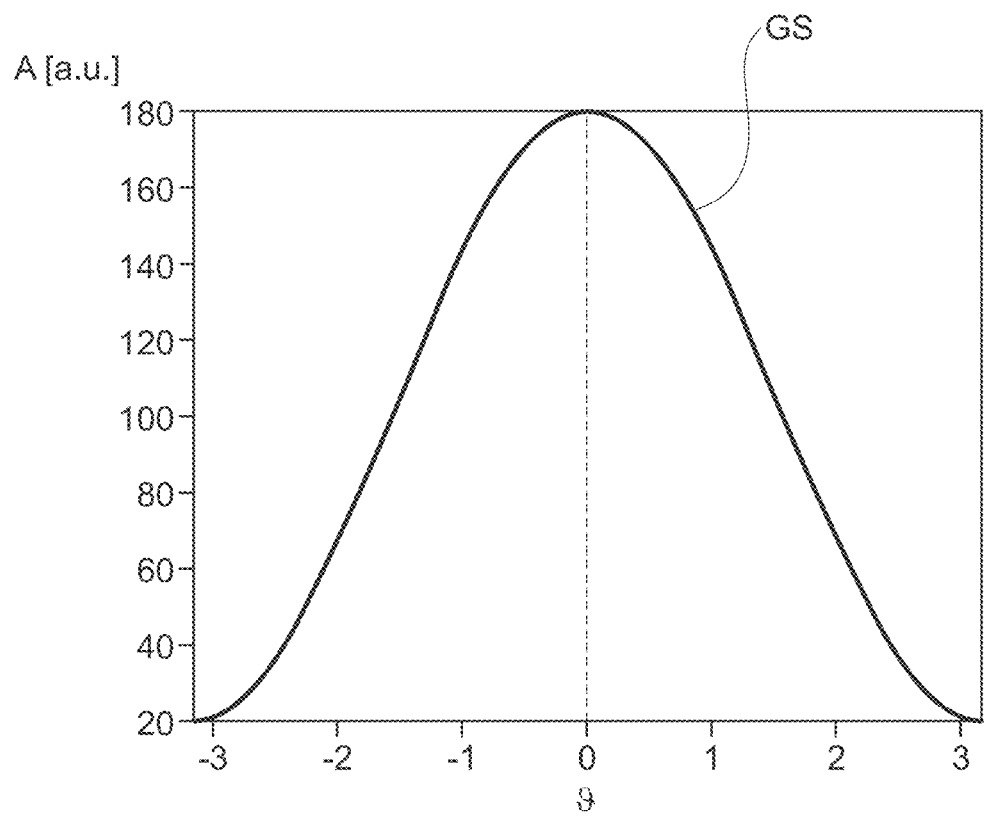
FIG. 7 shows a representation of a possible control signal for controlling a second energy beam source in an irradiation device.

For simplification, the modulation is described here as a function of the polar angle 9 on the circular path, and in FIG. 7 the amplitude A of the generator signal GS, which is correlated with the power to be emitted by the second laser 21b and consequently the absolute intensity of the second laser beam, is plotted in arbitrary units [a. u.] over the angle 9 (which in FIG. 6 runs from $-\pi$ to $+\pi$). At angle φ=0, the maximum amplitude of the generator signal GS is present and drops to a minimum value at angle φ=+/-π, so that the absolute intensity of the second, Gaussian-shaped laser beam EL2 periodically oscillates sinusoidally between a minimum value and a maximum value during one revolution over the circular path K. Without limiting generality, it is assumed here that the angle φ=0 is at the front in the scanning direction S. Accordingly, the intensity maximum value MAX of the total intensity distribution GIV is located at the front in the scanning direction S, and an intensity minimum value MIN is located at the rear, as shown in FIGS. 2 and 3.

By a simple phase shift of this generator signal GS, the maximum value MAX and the minimum value MIN can be shifted on the circular path K, i.e. rotated about the centre of rotation or the beam axis S1 of the top-hat intensity distribution. This is important in the event that the scanning direction over the build field 8 is changed, but possibly also for an adaptation of the overall intensity distribution GIV or the position of the maximum value MAX to an environment parameter at the current area of incidence AF.

The relative intensity differences between the maximum value MAX and the minimum value MIN on the intensity profile curve IPK can be adjusted by the amplitude A of the generator signal GS for the second laser beam EL2 shown in FIG. 7, for example. This is shown by way of example in FIG. 8 on the basis of three overall intensity distributions GIV shown side by side, with all overall intensity distributions GIV having the same basic shape and differing only in the heights of the maximum and the minimum or in the shape of the intensity profile on the intensity profile curve IPK along the circular path K along the edge of the overall intensity distribution GIV. Therefore, the basic shape of the overall intensity distribution GIV is distorted, with the minimum MIZ is being shifted backwards here in a direction opposite the scanning direction or with respect to the scanning direction within the overall intensity distribution GIV.

The exact form of the overall intensity distribution GIV that is optimal for the current manufacturing process can depend on various other process parameters, including the current scanning speed, amongst others.

Figure 8:
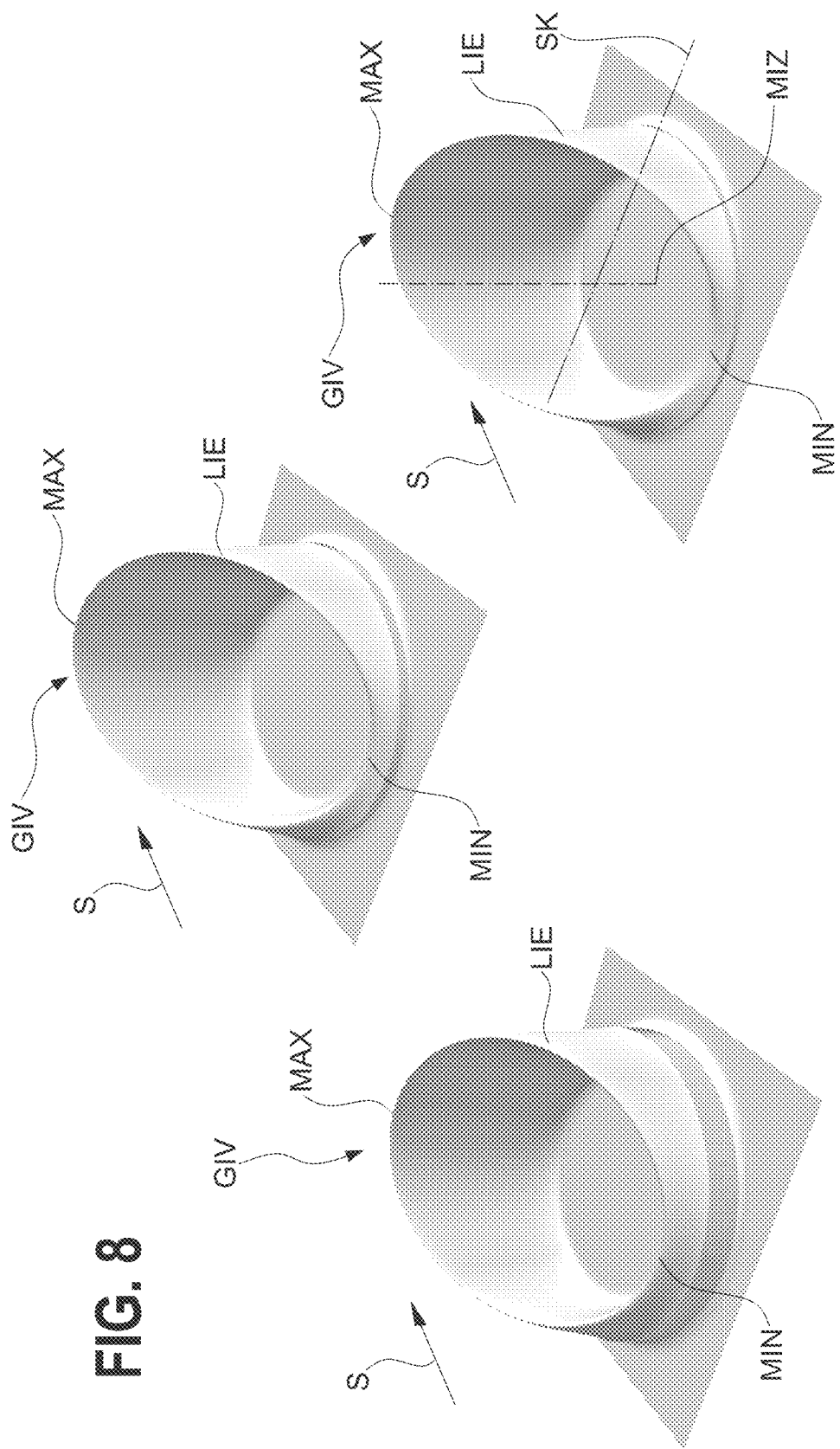
FIG. 8 shows a (overall) intensity distribution of a combination energy beam according to the invention as in FIG. 2 in a perspective plan view, but for comparison in three different embodiments, to show the dependence of the overall intensity distribution on the control signal according to FIG. 5.

FIG. 8 shows on the left side, for example, a simulation for an overall intensity distribution GIV at a scanning speed of 0.1 m/s. In the middle, an overall intensity distribution GIV for a scanning speed of 1.6 m/s is shown. The right-hand side shows an overall intensity distribution GIV for a scanning speed of 3.1 m/s. All overall intensity distributions GIV comply with the above criteria according to the invention.

By comparing the three overall intensity distributions GIV it can be seen that with increasing scanning speed the maximum value MAX increases in relation to the minimum value MIN on the intensity profile curve IPK. In other words, the functional region F2 "heat" (see FIG. 2 with the explanations in this regard) is particularly significantly increased in relation to the functional region "hold" F1. This can be simply explained by the fact that the functional region F1 "hold" is only needed as a "heat loss compensation area" to compensate for the losses due to heat flows within temperature differences between the weld pool and the surrounding material. An extent of the functional region F1 "hold" can thus scale with the material values, in particular the thermal conductivity, the thermocapillary convection and the temperature distribution in the vicinity of the weld pool. Especially with increasing speed, however, it loses significance compared to the other defined functional regions.

The functional region F2 "heat", on the other hand, is needed to preheat or heat up as yet unsolidified cold build-up material 13 or, to some extent, already solidified material of a neighbouring track (for example a neighbouring hatch) to the melting temperature. This region in particular scales with the speed of the area of incidence. With increasing scanning speed, the heating must take place correspondingly faster, i.e. more intensity is required and the maximum becomes higher and accordingly the functional region F2 also becomes wider, i.e. the functional region F2 extends far beyond the centre of the overall intensity distribution GIV to the rear. In the extreme case (see right-hand overall intensity distribution GIV in FIG. 8), the minimum value MIN of the profile curve IPK also corresponds to the absolute minimum MIZ of the overall intensity distribution GIV. Nevertheless, as can be seen in FIG. 8, the overall intensity distribution GIV still has a local minimum in the middle region with respect to a secant SK, since the second laser beam EL2 on the intensity profile curve IPK provides for a local increase of the overall intensity distribution GIV. The secant SK runs here perpendicularly to the scanning direction S through the centre of gravity (of the geometric figure) of the overall intensity distribution GIV, which is shifted slightly forward here in the scanning direction S between the centre through which the rotation axis or beam axis SA of the overall intensity profile GIV runs and the maximum value MAX.

It should be mentioned here that, quite generally, the functional regions can also take up an area-variable share of the overall intensity profile depending on certain constraint, such as the "scanning speed" and/or the "available maximum intensity" or "available power", by appropriately (in particular also dynamically) prescribing the control parameters for the energy beam, in particular for the combination energy beam.

Figure 9:
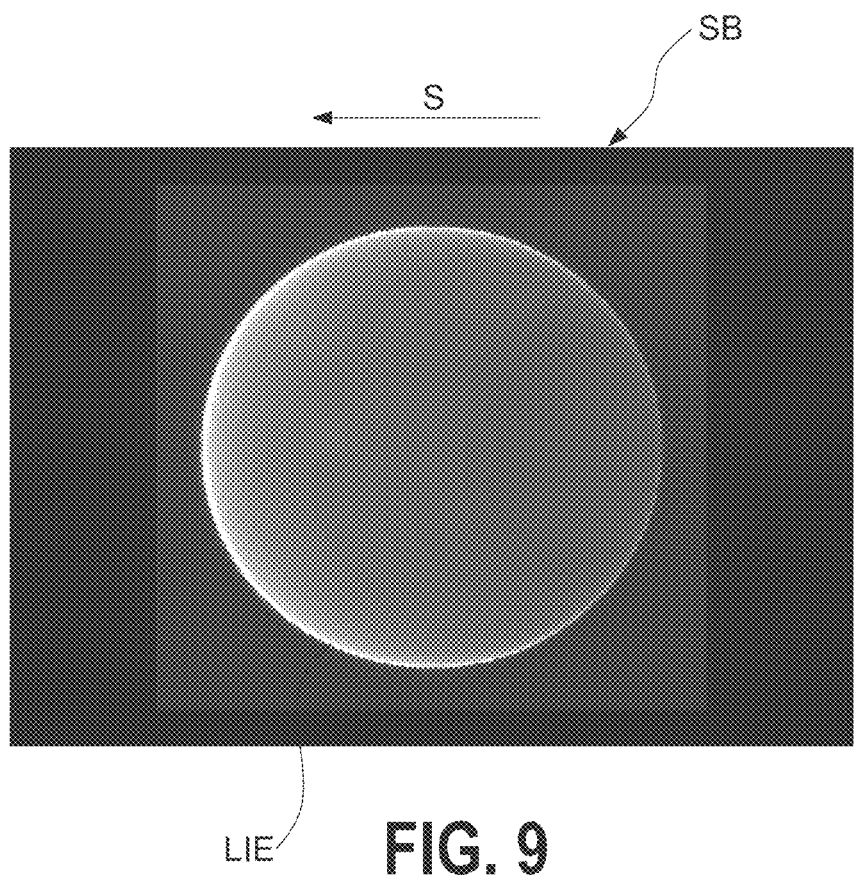
FIG. 9 shows a greyscale image of a (overall) intensity distribution according to the invention at the area of incidence of a combination energy beam as shown in FIG. 7 on the right.

FIG. 9, in this regard, shows a greyscale image SB of the intensity distribution of the combination energy beam, as would result, for example, from a beam as shown in FIG. 8 on the right. The light areas here are the areas with particularly high energy beam intensity. These clearly show a crescent shape or the shape of a half moon with the belly in the direction of the scanning direction S. This means that at the "leading edge" of the overall intensity distribution GIV, which first hits the material during the course of the feed movement or scanning movement, there is a strong intensity increase measured against the average intensity, which then drops off relatively steeply in the rear regions to then taper off gently and flatly towards the rear edge.

As mentioned above, in the embodiment examples shown, for example, a simple phase shift of the generator signal GS shown, for example, in FIG. 7, allows the second laser 21b to be controlled in such a way that the maximum value MAX and the minimum value MIN on the intensity profile curve IPK are shifted, i.e. such that the overall intensity distribution GIV is rotated about the centre of rotation or the beam axis SA of the overall intensity distribution GIV.

As mentioned, this may be necessary in case of a change of direction of the scanning movement, for example in case of a hatch reversal, if, when following the hatching course, the neighbouring hatch is to be scanned in the opposite direction at the end of a hatching line (hatch) in a radiation strip. On the other hand, however, it is also advantageous if the exact design of the overall intensity distribution GIV can be adapted to the area of incidence environment parameters, in particular to whether the current solidification takes place on a track or a hatch that runs parallel to an already solidified area.

Figure 10:
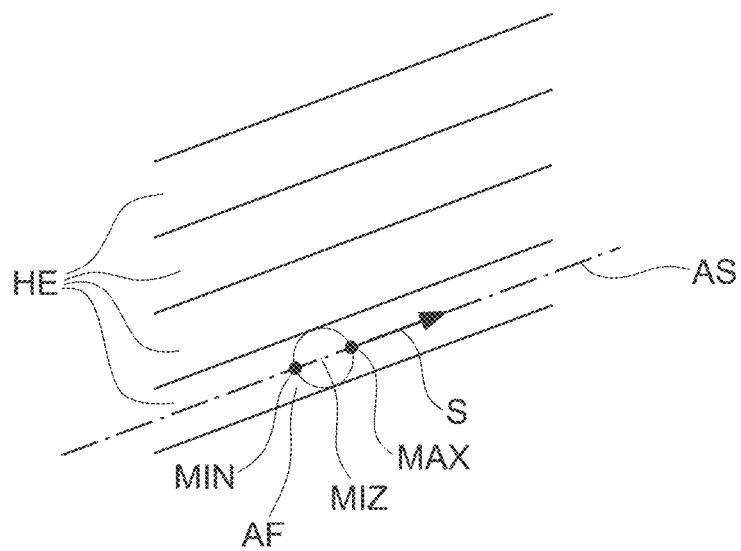
FIG. 10 shows a schematic representation for the modification of a (overall) intensity distribution according to the invention as a function of an area of incidence environment parameter.
Figure 10:
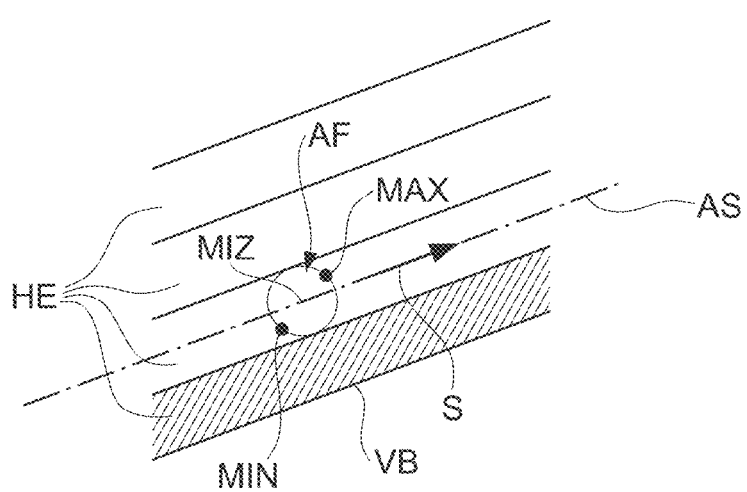

For this purpose, reference is made to FIG. 10 by way of example. In the upper image, four hatch tracks HE are shown here by way of example, with the area of incidence AF currently running in a scanning direction S along a first track HE, next to which there is not yet a solidified neighbouring track. Accordingly, the overall intensity distribution GIV is preferably oriented such that the maximum in the scanning direction S is exactly at the front and the minimum MIN is at the rear. In other words, the overall intensity distribution GIV is axially symmetrical with respect to a symmetry axis AS running parallel to the scanning direction S or coaxial to the scanning direction S.

The lower region of FIG. 10 shows the situation during solidification in a subsequent track HE, where the previous, immediately adjacent track is still warm but already solidified. Here it is advantageous if the intensity profile curve IPK is slightly rotated with respect to the scanning direction S, so that the maximum value MAX is somewhat further away from the already solidified region VB of the first track HE and the minimum MIN is somewhat closer to the solidified region VB. In other words, here the overall intensity distribution GIV is deliberately not axially symmetrical with respect to the axis of symmetry AS defined above, which is coaxial with the scanning direction S. The reason for this is that energy has already been introduced into the neighbouring hatch during its solidification. This is because the solidification of the individual adjacent hatches usually takes place in short time intervals, within which, typically, the melted build-up material does not cool completely, for example to an ambient temperature in the process chamber or in the build volume. Therefore, only the energy that is not dissipated by heat conduction into the material below needs to be provided to bind a current track HE to the immediately previously solidified, adjacent track HE. Here the scanning paths are shown strictly separated, or rather the overall intensity distribution is not larger than a single scanning path. In principle, however, an overlap would also be conceivable.

If the neighbouring track HE has already cooled down because it was solidified a relatively long time before the current track HE, it can be useful to orient the maximum value MAX of the overall intensity distribution for the irradiation of the current track HE in the direction of the already solidified and cooled track or to turn it from an initial position according to the upper illustration of FIG. 10. In this case, heat conduction is increased in the region of the current track HE to be solidified near the solidified track HE, so that more energy must be introduced there to achieve the desired solidification. This variant, however, is not shown in any of the figures.

Figure 11:
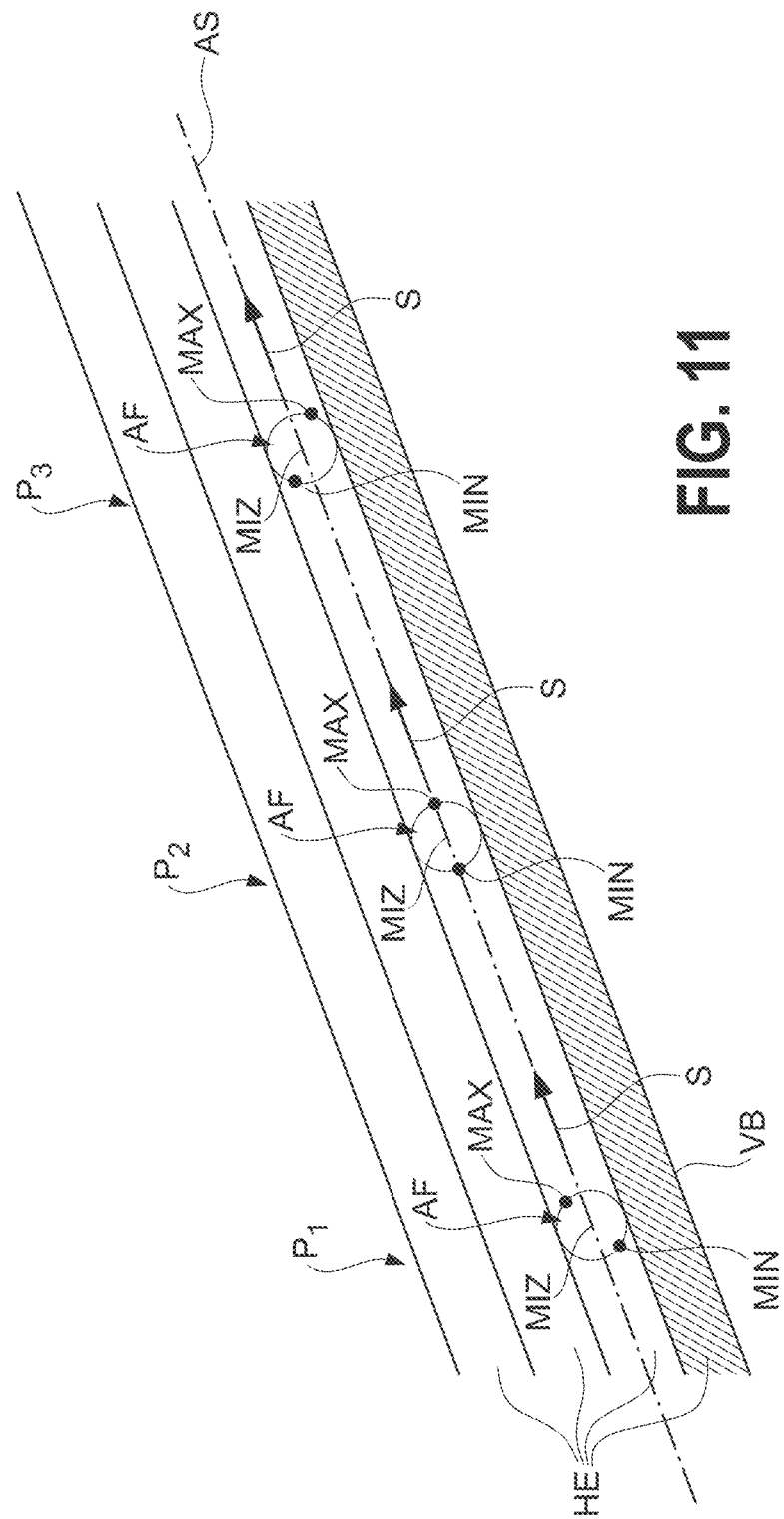
FIG. 11 shows a further schematic representation for the modification of a (overall) intensity distribution according to the invention as a function of an area of incidence environment parameter.

It is also possible to change strategy during the solidification of a single track, as shown schematically in FIG. 11.

If, for example, a current track HE is solidified in the opposite direction to a relatively long, previously solidified, immediately adjacent track HE, then at the beginning of the current track HE a previously solidified, adjacent region VB is relatively hot, since only relatively little time has passed since it was solidified. Towards the end of the track HE, however, the neighbouring solidified region VB becomes increasingly colder. Accordingly, the maximum value MAX at the beginning (position $P_1$) of the current track HE can be turned away from the neighbouring solidified region VB, i.e. it can be arranged closer to a track HE which is directly adjacent to the current track and which possibly is to be solidified subsequently, than to the solidified region VB. In the further course of the irradiation in the scanning direction S, the maximum value MAX of the overall intensity distribution is then rotated in such a way that it lies on the axis of symmetry AS (position $P_2$) and then successively, preferably continuously, is further rotated in such a way that at the end of the current track HE it is rotated towards the adjacent solidified region VB (position $P_3$), i.e. it lies closer to the solidified region VB than to a track HE which lies directly adjacent to the current track and which possibly is to be solidified subsequently.

FIGS. 12a to 12e show further possible (overall) intensity distributions that can also be generated by the ("smaller") second energy beam travelling along cyclic paths; here, in all cases, the path of the second energy beam again runs approximately parallel inside an edge of the energy distribution of the ("larger") first energy beam. In all cases, the first energy beam again has a plateau ("flat-top" or "top-hat intensity distribution"), but has a different geometric base area. In other words, the intensity distribution is spatially relatively homogeneous across the beam cross section with a relatively sharp edge. Such first energy beams with such energy distributions can also be generated with suitable beam-shaping units, such as diffractive optical elements (DOEs).

Figure 12A:
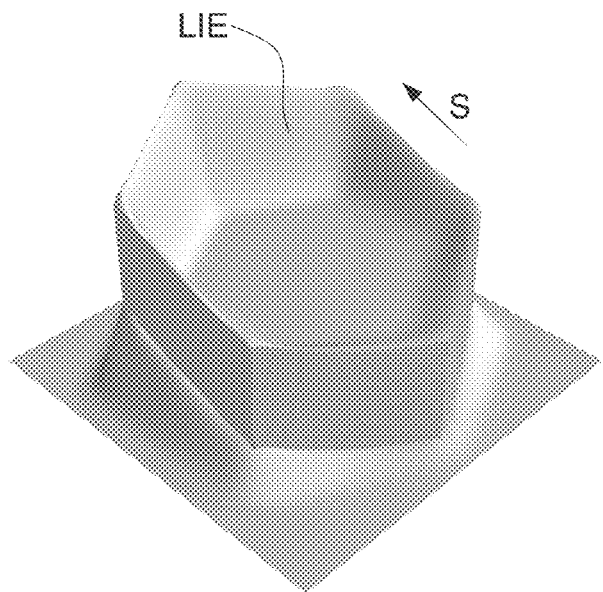
FIGS. 12a to 12e are each perspective views of alternative embodiment examples of intensity distributions according to the invention.
Figure 12B:
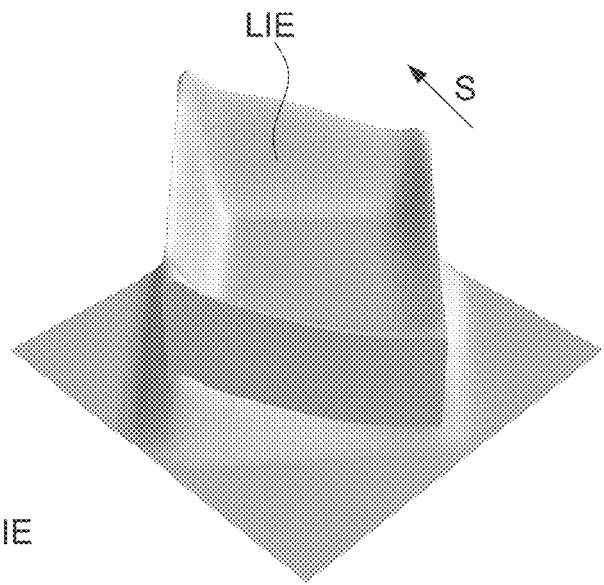
Figure 12C:
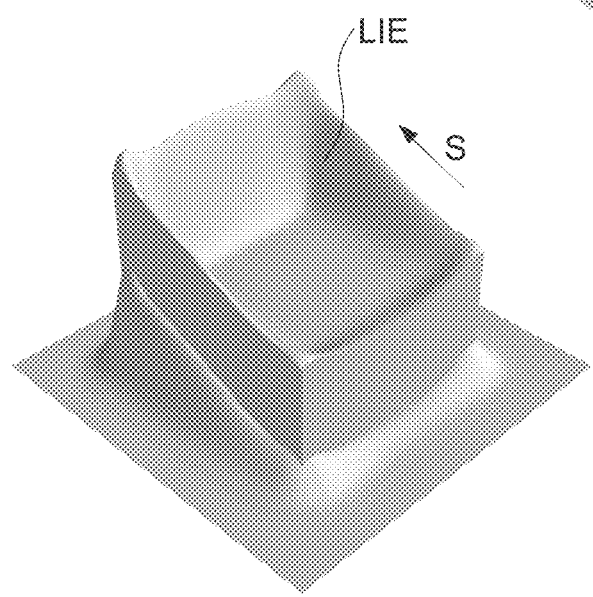
Figure 12D:
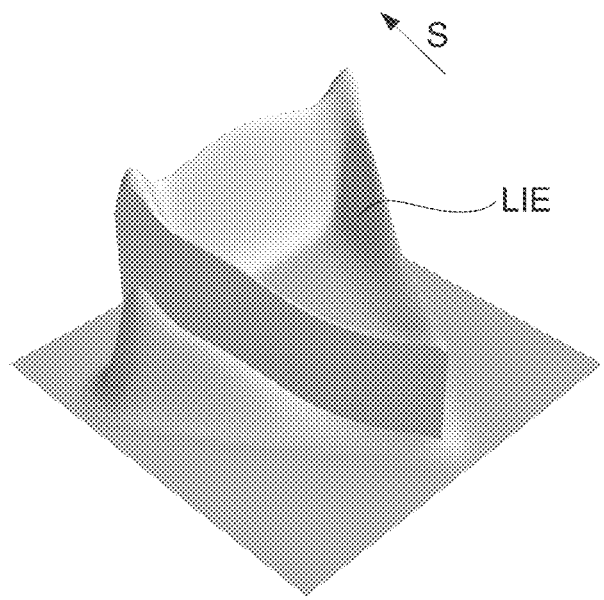
Figure 12E:
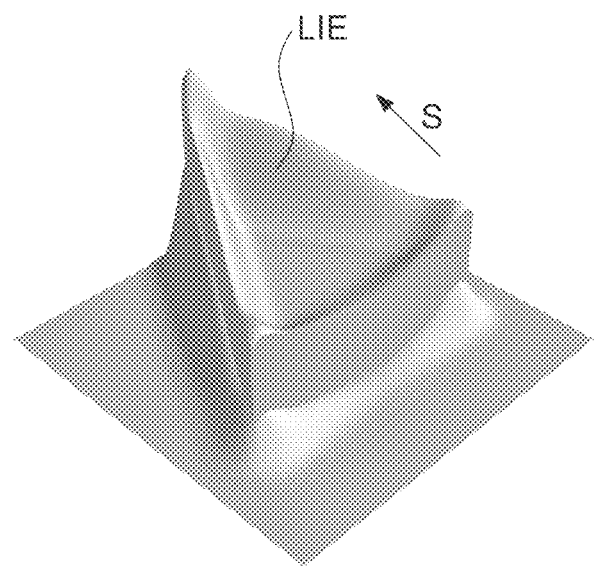

Specifically, FIG. 12a shows an intensity distribution with a hexagonal or honeycomb-shaped base area, with a corner lying at the front in the scanning direction S. FIG. 12*b* shows an intensity distribution with a quadrangular base area, and here as well a corner lies at the front in the scanning direction S. By contrast, in FIG. 12*c* the quadrangular base area of the intensity distribution is oriented such that an edge of the quadrangle (here a square) lies at the front in the scanning direction S. FIGS. 12*d* and 12*e* here show two triangular variants, once with a front edge perpendicular to the scanning direction S (FIG. 12*d*) and once with a tip or corner at the front in the scanning direction S (FIG. 12*e*).

As can be seen, however, all intensity distributions GIV shown in FIGS. 12*a* to 12*e* fulfil the criteria according to the invention in that they have at least one local minimum in a middle region along at least one secant of the intensity distribution in the section plane and in that they have an intensity profile curve running along an edge of the intensity distribution, which intensity profile curve has a maximum value at least at one point and a minimum value at least at one point in a region opposite the maximum value on this intensity profile curve.

In all cases, the second energy beam is also modified here in its intensity over the course of its path in such a way that, in each case, an intensity maximum or a maximum range (in the case of the distributions with the edges lying at the front) of the intensity distributions lies at the front in scanning direction S.

In practice, the edges or corners of the geometric figures of the intensity distributions shown in the figures with sharp edges can also be produced with rounded edges (for example due to the inertia of moving components of the beam generation or beam deflection).

Lastly, it is pointed out once again that the devices described in detail above are merely embodiment examples which can be modified by a person skilled in the art in a wide range of ways without departing from the scope of the invention. In particular, it is noted once again that a combination energy beam with a suitable overall intensity distribution can also be generated by ensuring, with two appropriately coordinated or synchronised controlled scanners at any time, that the first and the second energy beam are in the appropriate position superimposed on each other in the area of incidence, wherein the scanner for the second energy beam can then be moved correspondingly faster than the scanner for the first energy beam. It would also be possible, for example, to move an irradiation device with at least two beam sources together in order to move the area of incidence of the combination energy beam, whereby one of the beam sources additionally or superimposed executes a (preferably fast) relative movement to the other beam source, or at least the energy beam of one of the beam sources moved together can be moved relative to the energy beam of the other beam source with a movement unit provided for this purpose, for example with a mirror etc. Furthermore, in addition to the relative movement of the two energy beams with respect to each other, it would also be possible to use a (different) focus change or focus widening/defocusing of the energy beams. Likewise, the "shaping" of the energy beam, i.e. the generation of an intensity distribution according to the invention, could also be achieved by completely different means, as already mentioned. Lastly, it is again noted that the method could also be used for other processes besides additive manufacturing, for example for a welding of seams or the like. Furthermore, the use of the indefinite article "a" or "an" does not exclude the possibility that the features in question may be present more than once. Similarly, the term "unit" does not exclude the possibility that it consists of a number of interacting sub-components, which may also be spatially distributed.

REFERENCE LIST 1 additive manufacturing device/laser sintering device
2 manufacturing product/object/component
3 process area/process chamber
4 chamber wall
5 container
6 container wall
7 working plane
8 build field
10 support
11 base plate
12 build platform
13 build-up material
14 storage container
16 coater
17 radiation heater
18 sensor arrangement/camera
20 irradiation device/exposure device
21 energy beam source system/laser system
21$a$ laser
21$b$ laser
22 energy beam combination device/beam combiner
23 second energy beam movement unit/scanner/deflection unit
24 focusing device
25 coupling window
26 monitoring device
27 beam splitter
28 monitoring system
30 first energy beam movement unit
31 hollow shaft
32 optical element/transmissive beam shift element/flat plate
33 first energy beam movement unit
33' first energy beam movement unit
34 first mirror
35 rotating mirror
35' rotating mirror
36 rotation unit/electric motor
36' rotation unit/electric motor
37 converging lens
37' converging lens
50 control device
51 control unit
52 quality data determination device
53 irradiation control interface
54 control data generation device
54' control data generation device
55 bus
56 terminal
A amplitude of the generator signal
AF area of incidence
AL (output) combination energy beam/laser beam
AS symmetry axis
B section plane
d axial distance
DS beam extent/diameter
EL1 first energy beam/laser beam
EL2 second energy beam/laser beam
f focal length
FS focus control data
F1 functional region "hold"
F2 functional region "heat"

F3 functional region "shape"
GS generator signal
H horizontal direction
HE hatch tracks
HS heating control data
GIV overall intensity distribution
IPK intensity profile curve
K circular path
LIE local intensity increase
LSa, LSb laser control data
MAX local maximum value
MIN local minimum value
MIZ minimum
PST process control data
$P_1, P_2, P_3$ positions
QD quality data
R edge
RAh hollow shaft rotation axis
RAs mirror rotation axis
RAv virtual rotation axis
RS relative movement control data
RZ rotation centre
S direction of movement of the area of incidence/scanning direction
SA beam path/beam axis of the combination energy beam
SB greyscale image
SD scan control data
SE mirror plane
SK secant
SP1 first intensity distribution/top-hat intensity distribution
SP2 second intensity distribution/Gaussian intensity distribution
ST coating control data
S1 beam path/beam axis of the first energy beam
S2 beam path/beam axis of the second energy beam
TS support control data
V vertical direction
VB solidified region
x, y plane
z direction
Ω rotation speed
α angle
φ polar angle

The invention claimed is:

1. A method for generating control data for an additive manufacturing process performed by an additive manufacturing device in which a build-up material is irradiated with at least one energy beam on a build field, the method comprising:
providing a beam spot using the at least one energy beam that has an interior spot area and a perimeter surrounding that interior spot area, the beam spot being moved about a surface of the build field by the control data;
defining an intensity distribution of the beam spot at a region of incidence of the beam spot on the build field in a section plane running perpendicularly to a beam axis of the energy beam, wherein the intensity distribution includes:
at least one local minimum in a middle region of an area of the beam spot along at least one secant of the intensity distribution in the section plane;
an intensity profile curve running along an edge of the intensity distribution and around the perimeter of the beam spot, the intensity profile curve having a maximum value at one point, and, at least a minimum value at another point opposite the maximum value on the intensity profile curve; and
an intensity on the intensity profile curve running along the edge is, at any point, higher than the at least one local minimum in a middle of the intensity distribution.

2. The method according to claim 1, wherein the intensity distribution has a local intensity increase that extends in an at least partially annular circumferential perimeter of the intensity distribution.

3. The method according to claim 1, wherein the maximum value lies in an edge region of the intensity distribution of the perimeter of the beam spot lying at a front in a scanning direction of the energy beam on the build field.

4. The method of claim 3, wherein the front of the maximum value on the beam spot perimeter is rotatable away from the scanning direction.

5. The method according to claim 1,
wherein a ratio of the maximum value on the intensity profile curve to the intensity at a local minimum is at most 10:1; and/or
wherein a ratio of the minimum value on the intensity profile curve to the intensity in the local minimum is at least 1.5:1.

6. The method according to claim 1,
wherein the maximum value on the intensity profile curve is at least one and a half times the another point opposite the maximum value; and/or
wherein the maximum value on the intensity profile curve is a maximum of eight times higher than the minimum value at the another point in the region opposite the maximum value.

7. The method according to claim 1, wherein the intensity profile curve is curved between the maximum value and the minimum value in the region opposite the maximum value.

8. The method according to claim 1, wherein the intensity distribution of the energy beam is set to be axially symmetrical or non-axially symmetrical depending on an area of incidence environment parameter with respect to an axis of symmetry lying in a scanning direction.

9. The method according to claim 1, wherein the at least one energy beam includes a first energy beam and a second energy beam;
wherein the control data are generated in such a way that the first energy beam and the second energy beam are at least partially superimposed as a combination energy beam which is moved in a coordinated manner over the build field at a predetermined scanning speed, and at a same time there is a cyclic relative movement of the second energy beam with respect to the first energy beam that takes place at a predetermined speed greater than a scanning speed of the combination energy beam; and
wherein the second energy beam is intensity modulated depending on its relative position to the first energy beam and/or depending on a current direction of movement of the area of incidence of the combination energy beam.

10. The method according to claim 1, wherein the control data are generated in such a way that, when the additive manufacturing device is controlled using the control data, the build-up material within a target region is melted by heat conduction welding.

11. A method for controlling a device for additive manufacture of an object, wherein control data for the device are generated according to a method according to claim 1 and the device is controlled using the control data.

12. Control data for controlling an additive manufacturing device, the control data being configured to control the additive manufacturing device in such a way that a manufacturing product is manufactured using the method according to claim 11.

13. A computer program product having a computer program that can be loaded directly into a control device of a device for the additive manufacture of manufacturing products, having program sections to execute all steps of the method according to claim 1 when the computer program is executed in the control device.

14. A control data generation device for generating control data for an additive manufacturing apparatus performed by an additive manufacturing device in which build-up material is irradiated with at least one energy beam on a build field, the control data generation device comprising:
   providing a beam spot using the at least one energy beam that has an interior spot area and a perimeter surrounding that interior spot area, the beam spot being moved about a surface of the build field by the control data
   a computer-readable medium storing instructions; and
   a processor that executes the instructions to perform the following steps:
      defining an intensity distribution of the beam spot at a region of incidence of the beam spot on the build field in a section plane running perpendicularly to a beam axis of the energy beam, wherein the intensity distribution includes:
         at least one local minimum in a middle of an area of the beam spot along any secant of the intensity distribution in the section plane;
         an intensity profile curve running along an edge of the intensity distribution and around the beam spot perimeter, the perimeter of the beam spot having a radial width relative to an axis of the beam spot, the intensity profile curve having, at least at one point, a maximum value, and, at least at another point opposite the maximum value on the intensity profile curve, a minimum value; and
         an intensity on the intensity profile curve of the beam spot perimeter and running along the edge is, at any point, higher than the local minimum in a middle of the area of the beam spot of the intensity distribution.

15. A control device for a device for the additive manufacture of a manufacturing product in a manufacturing process, in which build-up material is built up and selectively solidified in a solidification process,
   wherein, for the solidification process, the build-up material is irradiated with at least one energy beam on a build field, wherein an area of incidence of the energy beam on the build field is moved in order to melt the build-up material,
   wherein the control device has a control data generation device according to claim 14 or an interface to a control data generation device for providing control data and is configured to control the device for irradiating the build-up material with the energy beam using the control data.

16. A device for the additive manufacture of manufacturing products in an additive manufacturing process, comprising:
   at least one feed device for introducing build-up material into a process area;
   an irradiation device for selectively solidifying the build-up material with at least one energy beam; and
   a control device according to claim 15.

17. A method for operating an additive manufacturing system having at least one energy beam generating a beam spot, the beam spot being controlled to impinge upon a build surface to solidify build material in consecutive layers of an object according to consecutive cross-sections of the object, further comprising;
   forming the beam spot with an interior area surround by a beam spot perimeter; and
   controlling a power intensity profile for the beam spot with the interior area surrounded by the beam spot perimeter having a lower power intensity than a perimeter power intensity maintained around the beam spot perimeter, the power intensity profile having a maximum value at one point and a minimum value at another point opposite the maximum value on the power intensity profile.

18. The method of claim 17, wherein the beam spot perimeter is in the form of an annulus surrounding the interior area.

19. The method of claim 18, wherein a maximum power for the beam spot perimeter is at a forward of movement of the beam spot over the build surface.

20. The method of claim 19, wherein the maximum power for the beam spot perimeter is rotatable away from the movement of the beam spot over the build surface.

21. The method of claim 17, wherein the at least one energy beam includes a first energy beam and a second energy beam, the second energy beam being combined with the first energy beam to form a combined beam and move within the beam spot perimeter, the second energy beam further being moved cyclically in the beam spot perimeter a cycle speed which is greater than a scan speed of the combined beam.

* * * * *